United States Patent
Correll et al.

(10) Patent No.: US 11,074,527 B2
(45) Date of Patent: *Jul. 27, 2021

(54) PROJECT MANAGEMENT SYSTEM AND METHOD

(71) Applicant: The United States of America, as represented by the Secretary of the Navy, Crane, IN (US)

(72) Inventors: Roger L. Correll, Bloomington, IN (US); Steven D. Lawyer, Elnora, IN (US); Thomas R. O'Brien, Loogootee, IN (US); James W. Evans, II, Bloomington, IN (US); Denise Wittmer, Elnora, IN (US); Karen B Hixson, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/048,292

(22) Filed: Jul. 29, 2018

(65) Prior Publication Data
US 2018/0349810 A1 Dec. 6, 2018

Related U.S. Application Data

(63) Continuation of application No. 12/623,374, filed on Nov. 21, 2009, now Pat. No. 10,037,498, which is a
(Continued)

(51) Int. Cl.
*G06Q 10/06* (2012.01)
*G06Q 50/18* (2012.01)

(52) U.S. Cl.
CPC ......... *G06Q 10/06* (2013.01); *G06Q 10/0631* (2013.01); *G06Q 10/0633* (2013.01);
(Continued)

(58) Field of Classification Search
None
See application file for complete search history.

(56) References Cited

U.S. PATENT DOCUMENTS

| 2002/0073114 A1* | 6/2002 | Nicastro | G06Q 10/10 705/36 R |
| 2003/0076360 A1* | 4/2003 | Barrow | G06Q 10/06 715/771 |

(Continued)

OTHER PUBLICATIONS

Collins, Jair, "Selecting The Right Supply Chain for a Customer in Project Business," An Action Research Study In The Mobile Communications Infrastructure Industry; Jan. 8, 2003; Helsinki University of Technology, 251 pages. (Year: 2003).*

(Continued)

*Primary Examiner* — Stephanie Z Delich
(74) *Attorney, Agent, or Firm* — Naval Surface Warfare Center, Crane Division; Christopher A. Monsey

(57) ABSTRACT

A project management system comprising a first, second, third, fourth and fifth processing sequences embodied in a computer readable medium. The first processing sequence is operable to provide a user interface to display a plurality of alert indicia corresponding to a plurality of alert status of a plurality of project requirements. The second processing sequence is operable to convert an incomplete requirement to a complete requirement upon completion of a task corresponding to the incomplete requirement. The third processing sequence is operable to determine the alert status of the requirements of the plurality of projects based on a time difference between a current date and a target date corresponding to each requirement. The fourth and fifth processing sequences are operable override the alert status based on user selections.

52 Claims, 25 Drawing Sheets

Related U.S. Application Data continuation of application No. 12/471,701, filed on May 26, 2009, now Pat. No. 8,156,050.

(52) U.S. Cl.
CPC ..... *G06Q 10/0635* (2013.01); *G06Q 10/0637* (2013.01); *G06Q 10/06313* (2013.01); *G06Q 10/06316* (2013.01); *G06Q 50/188* (2013.01)

(56) References Cited

U.S. PATENT DOCUMENTS

| | | | |
|---|---|---|---|
| 2003/0135401 A1* | 7/2003 | Parr | G06Q 10/06313 |
| | | | 705/7.23 |
| 2004/0158739 A1* | 8/2004 | Wakai | G06Q 10/107 |
| | | | 726/28 |
| 2004/0249694 A1* | 12/2004 | Luo | G06Q 10/10 |
| | | | 705/7.26 |
| 2005/0004831 A1* | 1/2005 | Najmi | G06Q 10/087 |
| | | | 705/7.22 |
| 2005/0027386 A1* | 2/2005 | Weigand | G06Q 10/10 |
| | | | 700/97 |
| 2006/0212327 A1* | 9/2006 | Norman | G06Q 10/06314 |
| | | | 705/7.23 |
| 2008/0228815 A1* | 9/2008 | Senn | G06Q 10/06 |
| 2010/0305987 A1* | 12/2010 | Correll | G06Q 10/0635 |
| | | | 705/7.28 |

OTHER PUBLICATIONS

"Microsoft Dynamics GP Project Management/Project Accounting," Microsoft Corporation, 2005, 4 pages. (Year: 2005).*

Rodrigues, A. G. and Williams, T.M. Systems Dynamics in Project Management: Assessing the Impacts of Client Behavior on Project Performance. The Journal of the Operational Research Society, vol. 49, No. 1, pp. 2-15. Palgrave Macmillan Journals, accessed Nov. 20, 2010. (Year: 1998) (Year: 1998).*

* cited by examiner

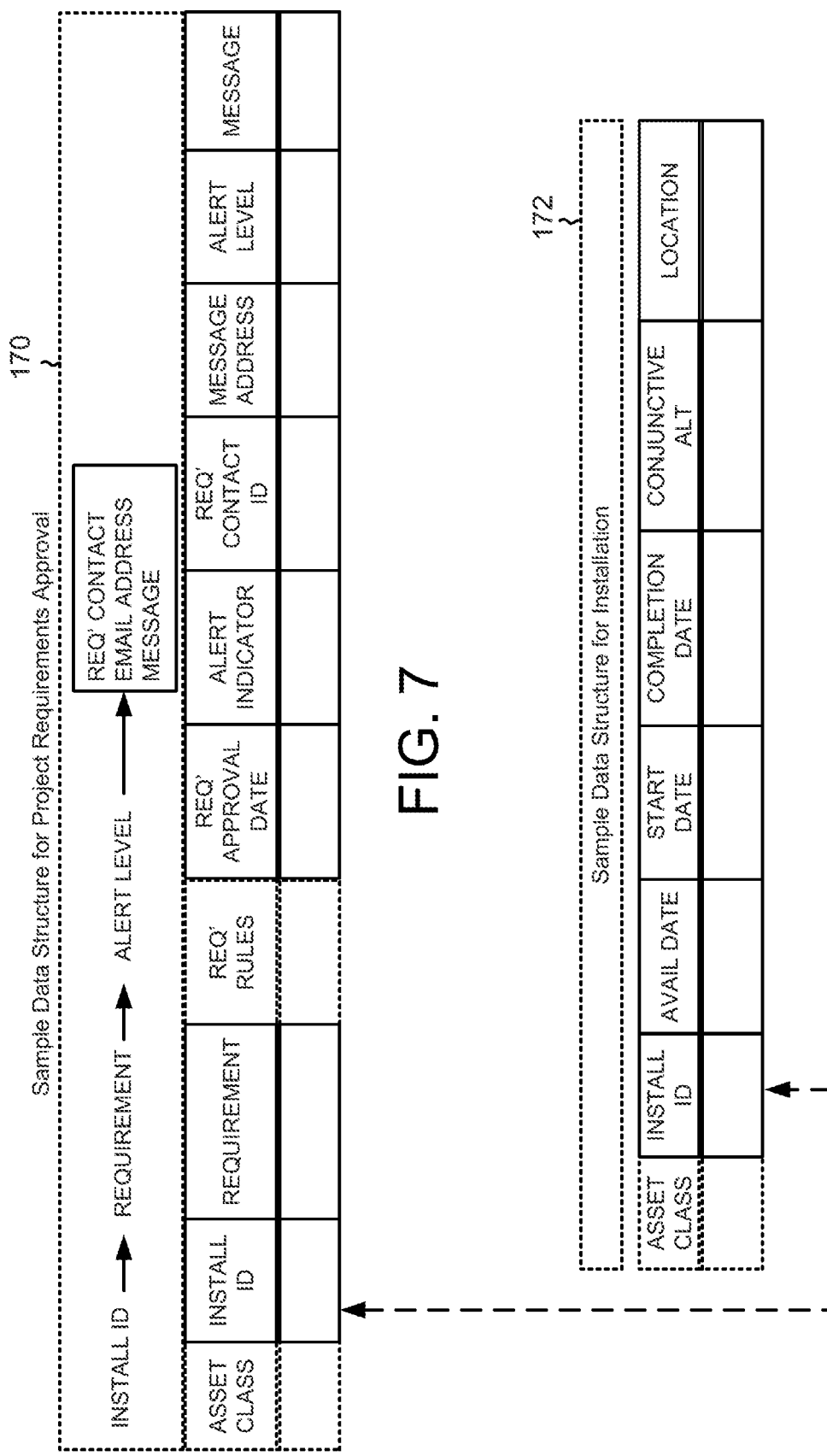

WORKLOAD PLANNER ☒

(CLICK ON THE HEADERS THAT CHANGE COLOR TO SORT BY)

46 RECORDS

SHIP CLASS: DDG 0051    SELECTION CRITERIA    COAST: BOTH

ALT TYPE: ALL TYPE    START DATE: CURRENT DATE + 30 DAY    END DATE: CURRENT DATE + 360 DZ 350      360

| SHIP | ALT TYPE | ALT IDENTIFIER | BASELINE | CONJ ALT | CONJ ALT NUM | AVAIL START | AVAIL END | COAST | AVAIL LOCATIONS | COMDDA STATUS | ILS DATE | SBDS APPROVED | RECORDS REQ |
|---|---|---|---|---|---|---|---|---|---|---|---|---|---|
| DDG 0074 | FC | CIN-6809 BFTT ENCRYPTOR MODERNIZATION | | NO | | 02/11/2009 | 04/14/2009 | ATLANTIC | | | | NA | LOA |
| DDG 8256 | FC | | | YES | 26296 | 02/31/2009 | 04/15/2009 | PACIFIC | SAFJOKO | | 05/04/2007 | NA | LOA CHG |
| DDG 0289 | SA | C8 AN/USI-146(V) | | YES | 76 | 02/31/2009 | 04/15/2009 | PACIFIC | SAFJOKO | | 07/12/2006 | 10/23/2008 | LOA CHG |
| DDG 0099 | SA | A DDL 0051 2940 H BR | | NO | | 02/11/2009 | 04/15/2009 | ATLANTIC | NAYPORT | | 11/14/2006 | 03/29/2006 | LOA CHG |
| DDG 0099 | SWD | SWD 73348 BFTT 3.3.1 | | NO | | 02/11/2009 | 04/15/2009 | ATLANTIC | NAYPORT | | 07/25/2007 | NA | AP1 |
| DDG 0099 | SCH | SWD 73349 BEWT 3.3B | | NO | | 02/11/2009 | 04/15/2009 | ATLANTIC | NAYPORT | | 04/4/2007 | NA | AP1 |

[PRINT TO EXCEL] [CLOSE]

GREEN- GOOD TO GO    P- PLANNED (CONFIRMED)    KIT BUILT

YELLOW- REQUIRES ACTION    A-9 DATE- COMMUNITY REVIEW    J- UNCONFIRMED PLANNED ALTERATION

BLUE    A-13    G- INSTALLED

| DOCUMENTS | REPORTS | INSTALLATIONS | MAINTENANCE | ADMINISTRATION |
|---|---|---|---|---|
| CHOOSE A DOCUMENT ⌄ | AVAIL PLANNING ⌄ | ⌄ | CHOOSE MAINTENANCE AREA ⌄ | CHOOSE ADMINISTRATION AREA ⌄ |

SELECT SHIP CLASS: [DDG 005] ⌄
SUBMIT

FOLLOWING IS A LIST OF ABBREVIATIONS USED THROUGHOUT THE AVAILABILITY PLANNING SPREADSHEET

SHIP INSTALLATION DRAWING STATUS
C- COMPLETE
E- NOT COMPLETE/NOT APPROVED
N/A- NOT APPLICABLE

APPLICABILITY STATUS CODE COLUMN ABBREVIATIONS
A- APPLICABLE, NOT AUTHORIZED
B- APPLICABLE AND AUTHORIZED (PROGRAMMED)
C- COMPLETED
E- INTENT EQUIVALENT ACCOMPLISHED
P- PARTIALLY COMPLETE
R- REPORTED COMP (ILS NOT VERIFIED)
X- CANCELLED

GSI B/L COLUMN ABBREVIATIONS
B- BASELINED
C- COMPLETE (INSTALLED)
N- NOT ON BASELINE
D- DELETED FROM BASELINE
P- BASELINE PNA
R- RISK FROM SUBMITTED
N/A- NOT APPLICABLE

ILS CERTIFICATION STATUS CODES
NR- NOT REQUIRED
NC- NOT CERTIFIED
XA- RETURN TO PRIOR APPROVER
CR- CERTIFIED
UD- UNDER DEVELOPEMENT
WA- ILS RISK ASSESSMENT APPROVED

MATERIAL STATUS
G (GREEN)
Y (YELLOW)  IF MATERIAL STATUS IS YELLOW OR RED
R (RED)  COMMENTS REFLECTING THIS STATUS
WILL BE IN THE NOTES COLUMN

FIG. 17

| DOCUMENTS | REPORTS | INSTALLATIONS | MAINTENANCE | ADMINISTRATION |
|---|---|---|---|---|
| CHOOSE A DOCUMENT ▽ | AVAIL PLANNING ▽ | | CHOOSE MAINTENANCE AREA ▽ | CHOOSE ADMINISTRATION AREA ▽ |

| LEGEND | ATLANTIC | PACIFIC |
|---|---|---|

FOLLOWING IS A LIST OF ABBREVIATIONS USED THROUGHOUT THE AVAILABILITY PLANNING SPREADSHEET

SHIP INSTALLATION DRAWING STATUS
C- COMPLETE
E- NOT COMPLETE/NOT APPROVED
N/A- NOT APPLICABLE

APPLICABILITY STATUS CODE COLUMN ABBREVIATIONS
A- APPLICABLE, NOT AUTHORIZED
B- APPLICABLE AND AUTHORIZED (PROGRAMMED)
C- COMPLETED
E- INTENT EQUIVALENT ACCOMPLISHED
P- PARTIALLY COMPLETE
R- REPORTED COMP (ILS NOT VERIFIED)
X- CANCELLED

CSI B/L COLUMN ABBREVIATIONS
B- BASELINED
C- COMPLETE (INSTALLED)
N- NOT ON BASELINE
D- DELETED FROM BASELINE
P- BASELINE PMA
R- RISK FROM SUBMITTED
N/A- NOT APPLICABLE

ILS CERTIFICATION STATUS CODES
NR- NOT REQUIRED
NC- NOT CERTIFIED
XA- RETURN TO PRIOR APPROVER
CR- CERTIFIED
UD- UNDER DEVELOPEMENT
WA- ILS RISK ASSESSMENT APPROVED

MATERIAL STATUS
G (GREEN)
Y (YELLOW) IF MATERIAL STATUS IS YELLOW OR RED
R (RED) COMMENTS REFLECTING THIS STATUS
WILL BE IN THE NOTES COLUMN

| DOCUMENTS | | REPORTS | | INSTALLATIONS | | MAINTENANCE | | ADMINISTRATION | |
|---|---|---|---|---|---|---|---|---|---|
| CHOOSE A DOCUMENT | ∨ | COMPLETED INSTALLATIONS | ∨ | | | CHOOSE MAINTENANCE AREA | ∨ | CHOOSE ADMINISTRATION AREA | ∨ |

COMPLETED INSTALLS RECORDS [X]

49 RECORDS | THROUGH LAST THURSDAY | DATA SHOWN FOR LAST [4] [∨] MONTHS

| SHIP | ALT TYPE | ALT IDENTIFIER | CONT ALT | CONT ALT NUMB | AVAIL START | AVAIL END | COAST | AVAIL LOCATION | ALT/AID COMPLETED | NOTES |
|---|---|---|---|---|---|---|---|---|---|---|
| DDG 0053 | FC | FC 38 AN/USQ-T46(V) | YES | 70290 | 07/16/2008 | 09/17/2008 | PACIFIC | SDBD | | |
| | FC | FC 7377D AN/USQ-T46 | NO | | 07/16/2008 | 09/17/2008 | PACIFIC | SDBD | | |
| | SA | SA DDG 0051 70039 R 00 | NO | | 07/16/2008 | 09/17/2008 | PACIFIC | SDBD | | |
| | SA | SA DDG 0051 70290 R 00 | YES | 58 | 07/16/2008 | 09/17/2008 | PACIFIC | SDBD | | |
| | SA | SA DDG 0051 70376 R 00 | NO | | 07/16/2008 | 09/17/2008 | PACIFIC | SDBD | | |
| | SWD | SWD 72194 3.2D2 | NO | | 07/16/2008 | 09/17/2008 | PACIFIC | SDBD | | |
| CG 0066 | FC | FC 38 AN/USQ-T46(V) | YES | 70290 | 07/23/2008 | 09/24/2008 | ATLANTIC | SDBD | | |

| DOCUMENTS | REPORTS | INSTALLATIONS | MAINTENANCE | ADMINISTRATION |
|---|---|---|---|---|
| CHOOSE A DOCUMENT ▽ | CHOOSE A REPORT ▽ | | CHOOSE MAINTENANCE AREA ▽ | CHOOSE ADMINISTRATION AREA ▽ |

222    224    220    226    228

ADD/EDIT EMAIL RECIPIENTS
ADD/EDIT EMAIL VERBAGE
ADD/EDIT FP ALT TYPE
UPLOAD DOCUMENT
ADD/EDIT ALT COSTS
ADD/EDIT INSTALL CONTRACTOR
ADD/EDIT FP SHIP CLASSES
ADD/EDIT DELIVERY SCHEDULE LOCATIONS

CATEGORY VIEWER  DELETE INACTIVE EVENTS

JANUARY 2009

<<PREV                                NEXT>>

| SUN | MON | TUE | WED | THU | FRI | SAT |
|---|---|---|---|---|---|---|
|  |  |  |  | 1 | 2 | 3 |
| 4 | 5 | 6 | 7 | 8⊕ | 9⊕ ILS | 10⊕ |
| 11⊕ | 12⊕ | 13⊕ | 14⊕ | 15⊕ | 16⊕ | 17⊕ |
| 18⊕ | 19⊕ | 20⊕ | 21⊕ | 22⊕ | 23⊕ | 24⊕ |
| 25⊕ | 26⊕ | 27⊕ | 28⊕ | 29⊕ | 30⊕ | 31⊕ |

PROJECT MANAGEMENT SYSTEM AND METHOD

CROSS-REFERENCE TO RELATED APPLICATIONS

The present application is a Continuation of U.S. patent application Ser. No. 12/623,374, filed Nov. 21, 2009, titled "PROJECT MANAGEMENT SYSTEM AND METHOD," which is a Continuation of U.S. patent application Ser. No. 12/471,701, filed May 26, 2009, and now patented as U.S. Pat. No. 8,156,050, titled "PROJECT MANAGEMENT SYSTEM AND METHOD," the contents of which are expressly incorporated by reference herein in its entirety.

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

FIELD OF THE INVENTION

Generally, the invention relates to a method and a system for managing projects. In particular, the invention includes a method and system for performing project tasks promptly based on the display of alert indicia.

BACKGROUND

A project is a set of tasks that use resources (money, people, materials, energy, space, provisions) to achieve project objectives. Project management is the function of organizing and managing resources to bring about the successful completion of project objectives. Projects include start, due and completion dates related to the tasks. Project tasks and milestones may be scheduled dynamically based on their timing relationships. For example, each task may have a preceding and succeeding task, wherein the completion of one task sets the start of the succeeding task, and the project is completed when all of the tasks are complete. A number of software programs, such as Microsoft Project, FastTrack Schedule, and Primavera, may be used to generate Gantt and PERT charts of projects. Tasks are related to requirements which may be hard and soft requirements. Hard requirements include, for example, provision of parts and equipment. Soft requirements include, for example, receiving approvals to proceed to a new project phase.

Inventories may be managed using software and databases. Inventories include physical parts which are stocked to maintain minimum stock quantities and which are ordered to satisfy minimum order quantities. In other words, inventory levels are maintained to balance carrying costs, ordering or shipping costs, and risks associated with the unavailability of parts. From a project management perspective, inventories or stock may be used to fulfill hard requirements.

The above-mentioned software programs and systems are operable to manage supply chains and inventories. Improvements are needed, however, in the systems and methods of managing multiple projects simultaneously. In many aggregate project management situations, there is no continuous demand or supply chain and the principal focus is not inventories or cost but, rather, maximizing the availability of assets.

SUMMARY

A project management system and method are disclosed herein. The method may be performed, at least partially, by the project management system. The project management system comprises a computing system having a computer readable medium and a first, second, third, fourth and fifth processing sequences embodied in the computer readable medium. The first processing sequence is operable to provide a user interface to display a plurality of alert indicia corresponding to a plurality of alert status. The alert status correspond to a plurality of requirements. The plurality of requirements correspond to a plurality of projects and include at least one of complete and incomplete requirements. The plurality of alert indicia represent the plurality of alert status. The second processing sequence is operable to convert an incomplete requirement to a complete requirement upon completion of a task corresponding to the incomplete requirement. The third processing sequence is operable to determine the alert status of the requirements of the plurality of projects based on a time difference between a current date and a target date corresponding to each requirement. The fourth processing sequence is operable to select a first project from the plurality of projects, select a project alert status, and override the alert status of incomplete requirements of the first project based on the project alert status selected. The fifth processing sequence is operable to select a first incomplete requirement of the first project, select a first requirement alert status, and override the alert status of the first incomplete requirement based on the first requirement alert status selected.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein:

FIGS. 7 and 8 are exemplary data structures used by the algorithm of FIG. 6;

FIGS. 11-12 are screen shots of an exemplary GUI;

FIGS. 13-16 are screen shots of the exemplary GUI of FIG. 11 illustrating a planned installations dashboard and a workload planner;

FIGS. 17-20 are screen shots of the exemplary GUI of FIG. 11 illustrating an availability planning report;

FIG. 21 is a screen shot of a completed installations report;

FIGS. 22-24 are screen shots of the exemplary GUI of FIG. 11 illustrating maintenance area editing dialogs; and FIGS. 25-27 are screen shots of the exemplary GUI of FIG. 11 illustrating administration editing dialogs.

DETAILED DESCRIPTION

Figure 1:
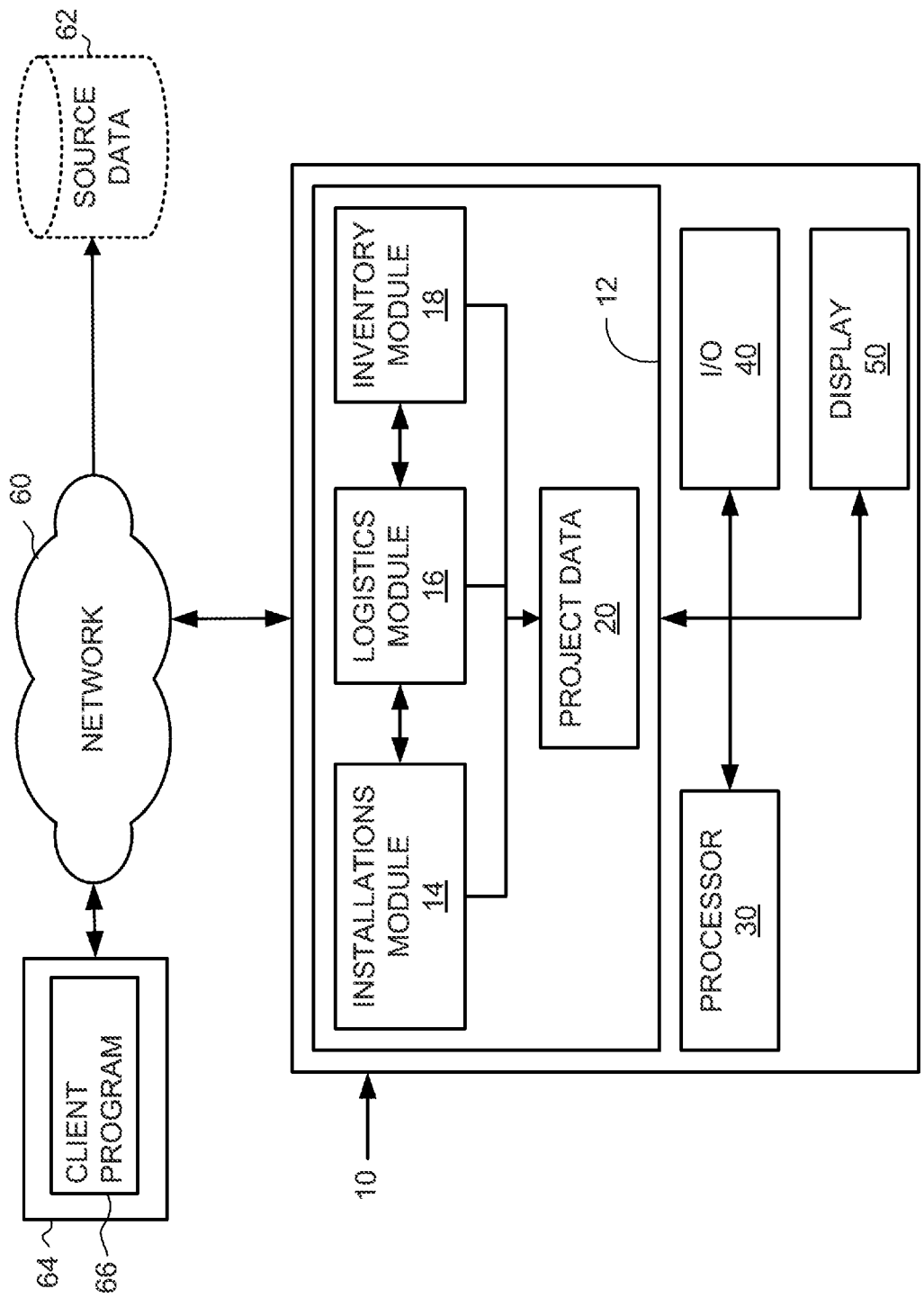
FIG. 1 is a block diagram of an exemplary computing system coupled to a network and showing exemplary software modules including modules for executing sequential and event-driven processes.

A project management method and system are described herein. The system includes a computing system and programs to acquire and manipulate project data. The project data is presented to a user for manipulation with a graphical user interface (GUI) with which the user can, at a glance, sense the status of requirements of a plurality of projects based on alert indicia, e.g. color coding schemes. The status of the requirements is determined by rules applied to project data. The user may drill down into a project using the GUI, select a group of projects related to a facility based on a status category, auto-initiate material movement forms, interface to a budgeting process, and provide timely notification of upcoming events and requirements via standard messaging processes.

Projects generally represent installations to be performed in relation to a facility. Projects comprise process requirements and installation requirements. Installation requirements are the designs, features, equipment, documentation, and other requirements which are used in the performance of the project. Process requirements are the documentation, approvals, releases, certifications and other requirements necessary to initiate or release performance of a project. An aggregate project management system may have defined process requirements even though the installation requirements may vary significantly between projects.

A facility may comprise a building such as a manufacturing plant, a vehicle such as a plane, truck, and the like, and an information system such as a printer, copier, computer, and the like. A group of like-facilities is referred to herein as a facilities group and a facilities group composed of transportation facilities is referred to herein as a fleet. Aggregate project management may concern the management of multiple projects in a single facility or in a fleet or in a facilities group such as a manufacturing system comprising multiple manufacturing plants or an asset lease program. Aggregate project management may also involve management of product development pipelines and technology/product platforms in a stage-gate process.

A facility, or similar resource, has available time and unavailable time. Some tasks may be performed during available time, but other tasks must be performed on the facility during unavailable time, for example to install equipment, upgrade software, maintain facility systems, train individuals on the use of upgraded software and systems, and so on. To maximize available time, or productivity, of the facility, a plurality of project tasks are managed in aggregate. Available time may comprise one or more discrete time periods. For example, an ecommerce business may have available time each day between 0-2 a.m. Data including XML code and product images may be fed to servers during that time. Before releasing the feed, however, the images must be produced, the XML code programmed, and web pages produced by the code tested to ensure they display images correctly. The release process may include a number of process steps such as image release, code release, page testing etc. The pages may vary, but the release process is constant to ensure that new pages may be uploaded periodically without impacting the ability of web users to purchase products. Multiple releases may be performed in multiple servers, each configured differently, thereby constituting different facilities.

The availability of facilities depends on business or other objectives. One exemplary objective is to maximize available time of the most productive facilities. Another is to maximize available time of critical facilities. A third exemplary objective is to maximize the aggregate availability of a fleet. In one embodiment, the availability of facilities is provided to the system and cannot be changed by the system. Object movements, e.g. materials, code, images, etc., may be tracked by an inventory module and material transfer documents which facilitate data input into the module indicating material ownership, location, availability and so on.

Projects may be developed in a planning process concerning a facility or facilities group or may be the outcome of a revitalization and maintenance plan, referred to herein as a modernization plan. A modernization plan generates installations for like-facilities based on an expected life-expectancy of equipment and systems already installed in the facility. A modernization plan may also be based on software upgrades to fix bugs, for example. In the software example, the modernization plan would identify all buggy software installations for upgrade. In the life-expectancy case, the plan might identify for upgrade all facilities having a part in service for longer than a predetermined time related to its expected useful life. A modernization plan may further categorize components or assets of facilities in asset classes.

Project data includes installation requirements data, process requirements data, inventory data and facilities data. The terms "include" and "comprise," and synonyms and derivatives thereof, are open transition terms used throughout this disclosure to exemplify objects without in any way limiting the number of additional objects which may be included. Installation requirements data may include a description of the requirements, a category label of a category related or associated with such a requirement, and other types of data. Process requirements data includes process requirements predetermined according to defined process steps. Different processes may be configured having different steps and step criteria. Rules stored in a system memory define the criteria.

The system has a number of programs for generating reports, producing graphical displays, receiving user inputs using graphical user interfaces including dashboards, and generally facilitating project management. FIG. 1 is a block diagram of an exemplary computing system embodiment. The system, referred to by numeral 10, includes memory 12 comprising installations module 14 for editing and presenting project data in documents, reports and dashboards, logistics module 16 for planning material and document movement, inventory module 18 for producing material transfer reports and managing materials, and data store 20 containing project data. Module 14 is an event-driven module in which the events may or may not be sequential. Modules 16 and 18 utilize sequential approval processes to authorize material and logistical events. Computing system 10 communicates with network 60 which may be operably coupled to one or more data sources, exemplified as source data 62, for acquiring project data, and to computer 64 having client program 66 which may be a browser. The browser may present in a display of computer 64 web pages pushed by system 10. Alternatively, system 10 may transfer data for generating a user interface without a browser. Additional components of system 10 include processor 30 which controls the performance of program modules 14, 16 and 18, data input/output I/O 40 and display 50 which presents project data as described further below.

Approval process data such as project, item, and installation data may be obtained from a plurality of sources. Data may be obtained over a network which may include the internet, may be downloaded from a connected system, and some data may be input by a system operator/user. The plurality of sources may be controlled by different entities, and the data contained therein may change frequently. A data structure may be created based on the structure of the data sources which may be comma or tab delimited, SQL and the like. After creation, data is uploaded to the database. Uploading may be through the internet using any program capable to upload files. An exemplary program is the COLD FUSION™ program distributed by ADOBE™ Systems Incorporated. Project data is processed, for example using Sequel Integration Services, to populate the database. COLD FUSION™ program reports and menus are then generated from which Dynamic Cold Fusion Language Markup pages are created. The pages are pushed by system 10 to client machine 64 when a user accesses system 10. Source data may be conditioned to conform multiple source structures and data scope into a a common structure and scope. In one embodiment, the planning horizon is limited to a number of years, e.g. 5 years, and source data dated beyond the planning horizon is excluded. In some embodiments, selected fields are parsed and data is excluded if the field does not contain a particular text string or contains a specific text string. In other embodiments, data from multiple fields is combined to form unique identifiers. Date criteria may filter out installations which cannot be completed within a predetermined timeframe. For example, an installation may be filtered out when the target date for accomplishing a task is greater than or equal to the value of the present date minus 12 months. Type criteria may filter out projects which may be performed during unavailable time, e.g. audits ("AUD"). Status criteria may filter out installations based on a status code. For example, installations with an alteration type equal to "A" or "B" may be presented while installations with other status values may be filtered out.

Figure 2:
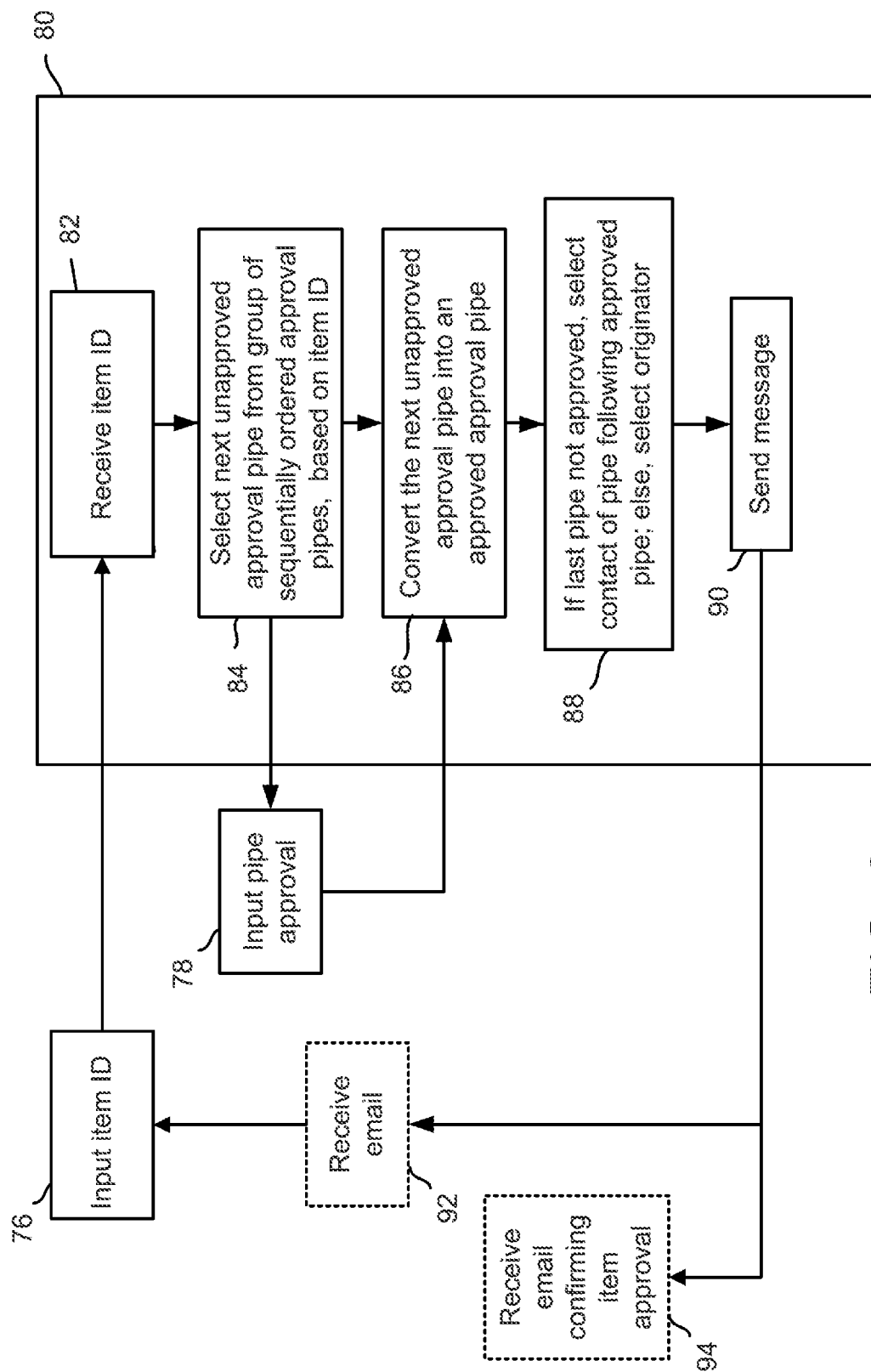
FIG. 2 is a block diagram of an exemplary algorithm for executing a sequential approval process.
Figure 3:
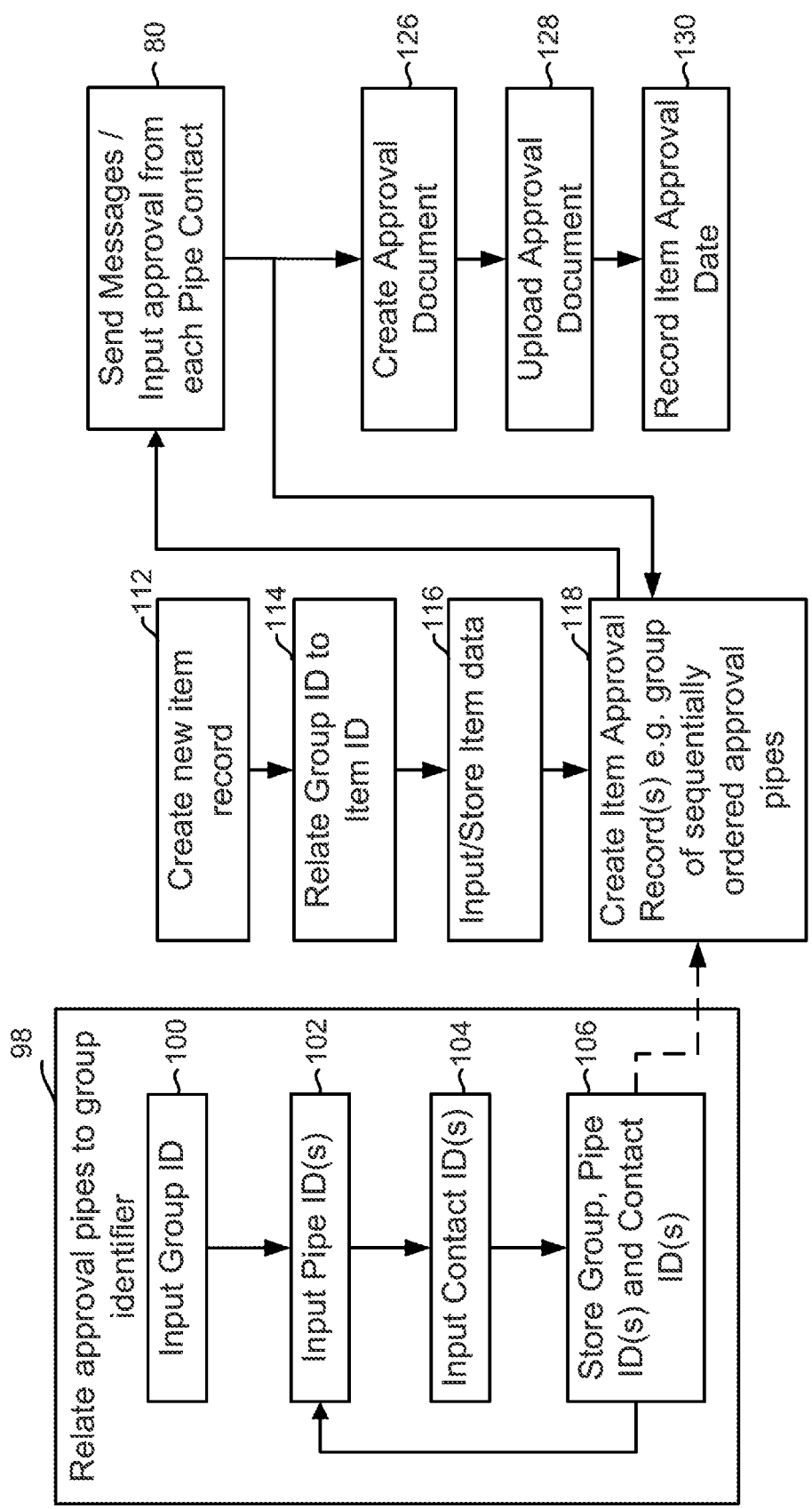
FIG. 3 is a block diagram of an embodiment of a module for configuring the sequential process of FIG. 2.
Figures 4, 5:
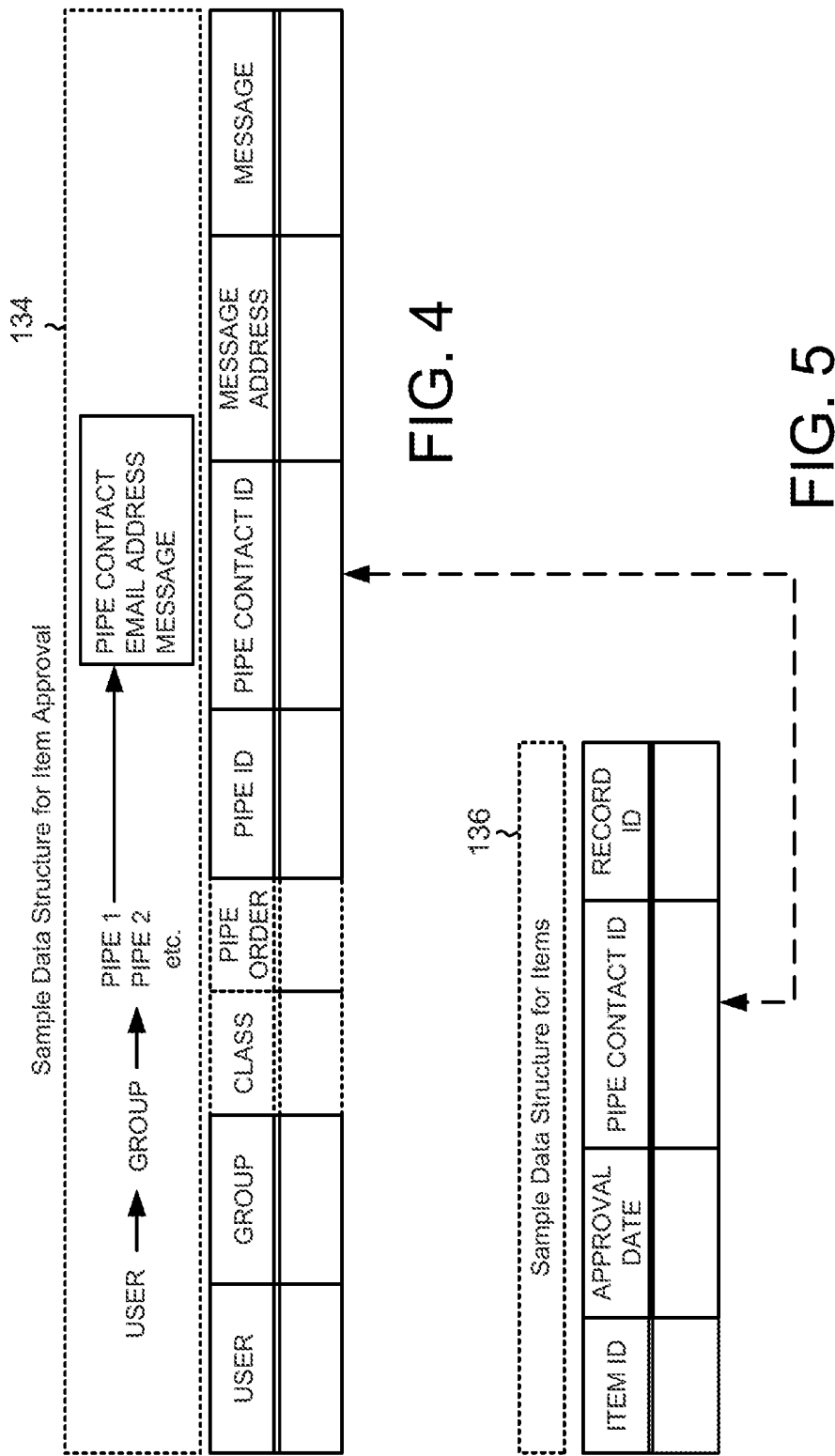
FIGS. 4 and 5 are exemplary data structures used by the algorithm of FIGS. 2 and 3.

FIG. 2 is a flowchart of a sequential approval process executable by a module and FIG. 3 is an embodiment of a module for enabling the sequential approval process of FIG. 2. Exemplary data structures 134 and 136 used by the algorithms of FIGS. 2 and 3 are shown in FIGS. 4 and 5. Data structure 134 includes a plurality of fields for configuring the approval process sequence including messaging information. Data structure 136 maintains approval dates for each sequential approval for each item. Generally, the sequential approval process comprises several steps for managing the timeliness by which approvals for items are performed. The process prompts pipe approvals based on a group selection. Different groups have different approval processes comprising different approval pipes, each pipe comprising at least one departmental or functional approval, e.g. quality, accounting, engineering, marketing, finance, and the like. Groups may be sub-classified to provide additional flexibility. Modules receive and store item, group and approval information. Initially, an originator enters item information and a group is associated with the item based on the originator. Group contacts corresponding to approval pipes then give pipe approvals in sequence until all approvals are obtained. Modules may store the item information as project data or separately in an item database which also contains fields storing approval pipes and pipe approvals. The sequential process may also be used as a stand-alone process for other purposes. Items may be materials, shipping requirements, and any other tangible and intangible items. Once an item is configured as described with reference to FIG. 3, the approval process prompts contacts to approve pipes. An item is approved when the last pipe in the sequential process is approved. The outcome of the approval process may be an approval document, a tag in an approval field showing approval of the item, and the like.

A module such as module 16 or 18 provides a GUI where, at 76, a contact (user) logs in and inputs an item ID. A submodule, referenced by numeral 80, receives the item ID at 82 and at 84 selects a next unapproved approval pipe from a group of sequentially ordered approval pipes related to the item, the next unapproved approval pipe being the first unapproved approval pipe in the group of sequentially ordered approval pipes. At 78, the GUI then enables the contact to enter a pipe approval. If the contact is configured to enable multiple pipes, the GUI may present the necessary objects to enable the contact to do so. At 86 submodule 80 receives a pipe approval from the pipe contact and, upon receipt of the pipe approval, converts the next unapproved approval pipe into an approved approval pipe, for example by inserting an APPROVAL DATE in data structure 136 for the item selected by the user at 76. Then, at 88, submodule 80 searches data structure 136, shown in FIG. 6, and determines whether the last approval has been received, for example by looking at the APPROVAL DATE fields. In alternative embodiments an approved status field may be used instead to track pipe approvals. If it has, then at 90 submodule 80 notifies the originator by sending a message which can be any type of information conveying mechanism such as email, voicemail, fax, text-message, and the like. If it has not, then submodule 80 finds the next unapproved pipe and, at 90, sends a message to the contact for the unapproved pipe. At 92, the contact may receive the message sent at 90 which may prompt approval. Thus, in the first pass-through, submodule 80 will select the pipe contact for the first approval pipe in the order and in the last pass-through submodule 80 will select the item originator. At 94, the originator may receive the message sent at 90 indicating final approval. Upon receiving the final approval, the originator may perform any number of optional actions such as printing a record of the approval, uploading or linking the item to other processes and so on. In exemplary embodiments, final approval of a material item enables sequential processes for shipping the item and for updating inventories.

The sequential process has to be configured for each group, and groups have to be related to contacts, before submodule 80 may function. FIG. 3 is a block diagram of an embodiment of a module for executing the sequential process of FIG. 2 illustrating additional processing sequences for configuring the sequential process for each item, configuring groups and messages, and providing a GUI with which users can input information. Configuration may be performed with a GUI providing a form in which all the enabled selection fields are provided, or each enabled selection field can be provided sequentially. If provided sequentially, a user may set the approval order based on the selection sequence. Otherwise, a PIPE ORDER field may be provided. Block 98 represents a plurality of processing sequences for relating approval pipes to a group identifier. A group is input at 100 after which approval pipes are input or selected at 102, contacts for each pipe are input or selected at 104, and at 106 the group and pipe information is stored in data structure 134. The sequence repeats until all pipes in a group are entered to form a group of a plurality of approval pipes. Not shown are lists of groups and pipes which are used to populate GUI drop-down lists or checklists. Groups and pipes in the lists may be enabled or disabled from time to time to limit their use. A pipe contact may be defined as a pipe contact for multiple pipes and groups or may be limited to a specific group or a specific pipe. The functionality described above provides significant flexibility in the design of approval processes based the association of generally standard organizational and employee or agent information.

At 112 a new item record is created which is related to a group ID at 114. The new item record is created in a data structure (not shown) for storing details pertaining to the item. The item receives a unique item ID if it is a new item or, otherwise, the user selects an existing item to populate the record with item details. Item data is received at 116 and stored in the item record. Item data includes relevant item information which depends on the kind of item. A material item may include information such as owner, serial number, version, production date, weight, cost, kit number and so on. A logistics item may include shipping and receiving destination and date information, tracking number, item number of the item shipped, and so on. Any kind of item may be defined and approved using the sequential process.

Approval records are created at 118 in data structure 136 corresponding to each approval pipe selected at 102. Upon configuration, submodule 80 performs the approval steps described with reference to FIG. 2. At 126, the originator may create a document reflecting the approvals of the item which may include pipe approval dates and contacts, for example. In one embodiment of a process executed by module 14, the user may then upload at 128 the approval document created at 126 and, at 130, module 14 or another module may record the upload date as the date in which the item was approved. Such approval may constitute an event of the event-driven approval process described in FIG. 9.

Figure 6:
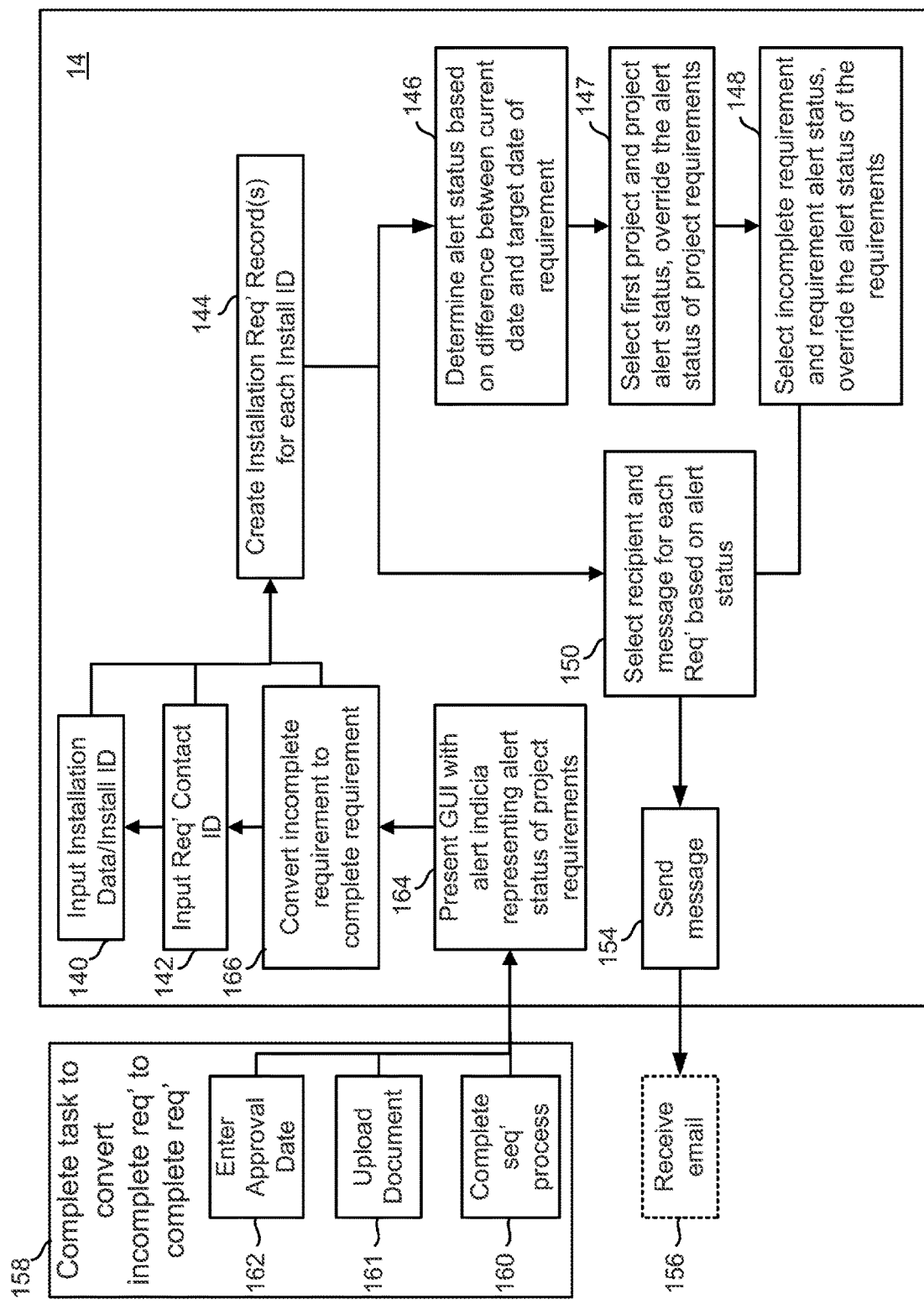
FIG. 6 is a block diagram of an exemplary algorithm for executing an event-driven approval process.

FIG. 6 illustrates an algorithm for executing an event-driven process. Exemplary data structures 170 and 172, used by the algorithm of FIG. 6, are shown in FIGS. 7 and 8. Data structure 170 includes a plurality of fields for configuring the approval process including messaging information. Data structure 172 maintains approval dates for each approval step. The process comprises several steps for managing the timeliness by which approvals necessary to fulfill requirements are performed. Requirements may be process steps, items, tasks, and the like. In this exemplary embodiment, a module such as module 14 provides a GUI where, at 140, a user provides input relating to installations. As described above, installations are projects having tasks performed at a facility which has availability constraints. The tasks relate to process requirements and alert indicia illustrate the alert status of each requirement to illustrate the overall status of a plurality of projects. As in FIG. 3, module 14 receives information from the user concerning various requirements which must be fulfilled in the event-driven process including contact and messaging information for each person responsible for approving a requirement of the approval process. Said information is stored in data structure 170 and installation data is stored in data structure 172. The information is linked based on the INSTALL ID which is unique to each installation therefore projects are thus linked to facilities information. Data structure 172 includes fields for ASSET CLASS, facility (asset) AVAIL DATE, installation START and COMPLETION DATE, e.g. a window where installations are permitted, CONJUNCTIVE ALTerations and LOCATION. Conjunctive alteration information may also include the alteration ID of the conjunctive alteration and other information for coordinating installation of the conjunctive alterations. Asset classes are provided to coordinate deployment of upgrades across asset classes. Location is provided to define where the asset will be located during the availability period.

At 144 new records are added for new installations in data structure 170. As stated previously, installation information and approval process information is also known as project information. In the embodiment shown, rules (described below) are embedded in code for efficiency and are applied to all installations in the same manner, which presumes that all installations follow the same approval process (including override options). In an alternative embodiment, installations may be sub-classified based on asset class or other dimension, and each dimension may have its own set of rules which may be provided in data structure 170 as requirement rules. This would provide a more dynamic and flexible system. Installations data may be sourced externally and periodically, e.g. daily, from data source 62 to reflect changing business or mission needs.

At 146, module 14 determines the alert status of the requirements of the plurality of projects based on a time difference between a current date and a target date corresponding to each requirement. At 147, a processing sequence of module 14 enables a user to select a first project from the plurality of projects and to select a project alert status. Based on the selections, module 14 overrides the alert status of incomplete requirements of the first project based on the project alert status selected. The override may be implemented by toggling a status field such as the ILS_Color indicator field. Module 14 may evaluate the indicator fields first and, if set, may ignore the time-based calculation since the result is overriden by the status of the indicator field. At 148, module 14 enables a user to select a first incomplete requirement of the first project, select a first requirement alert status, and override the alert status of the first incomplete requirement based on the first requirement alert status selected. The override is implemented as described with reference to the processing sequence described in step 147. Users may approve requirements in a plurality of event types. Block 158 illustrates some of the event types which, upon completion of the event, cause, at step 166, conversion of the incomplete requirement into a complete requirement. The event types include completing a sequential process related to an item at 160, uploading documents at 161, and setting approval dates of requirements at 162.

Based on the alert status of each requirement, a message and contact may be selected at 150 and sent at 154. In one embodiment, messages are not sent to contacts of approved requirements or contacts of requirements not yet having an alert status of sufficient importance. For example, if a requirement must be fulfilled between 60 and 90 days from a target date, and, based on the current date, the process is at 80 days from the target date, no message would be required. A message may be sent at 75 days to prompt action before the deadline, a more urgent message may be sent at 60 days indicating a bottleneck occurred by the failure to approve, and an even more urgent message may be sent at 45 days, and so on. The alert level field may also comprise subcategories within each alert level with corresponding messages so that a first message at a given alert level is sent followed by a second message at some predefined time interval, e.g. fifteen days, raising the urgency or tone of the message and so on. The predefined time interval is selected to be a fraction of the time permitted before the alert level raises to the next level. While the event-driven approval process may be sequential due to selected timing rules, it may also be non-sequential in that requirements are not necessarily (but could be) related in predecessor/successor relationships.

Data structure 170 allows each requirement to have a plurality of messages and contacts based on the desired number of alerts. The contact may receive the message, e.g. email, at 156 which may prompt a response at 158. Inputs and responses are received at 164 by a GUI including an installations dashboard described in detail further below. The GUI presents alert indicia representing the alert status of project requirements. Upon receipt of approval input, the approval date may be stored at 166 to register that the requirement is complete. The installations dashboard may be used to modify project data. The dashboard may facilitate drill-down into secondary, e.g. sequential, processes to identify bottlenecks.

Figure 9:
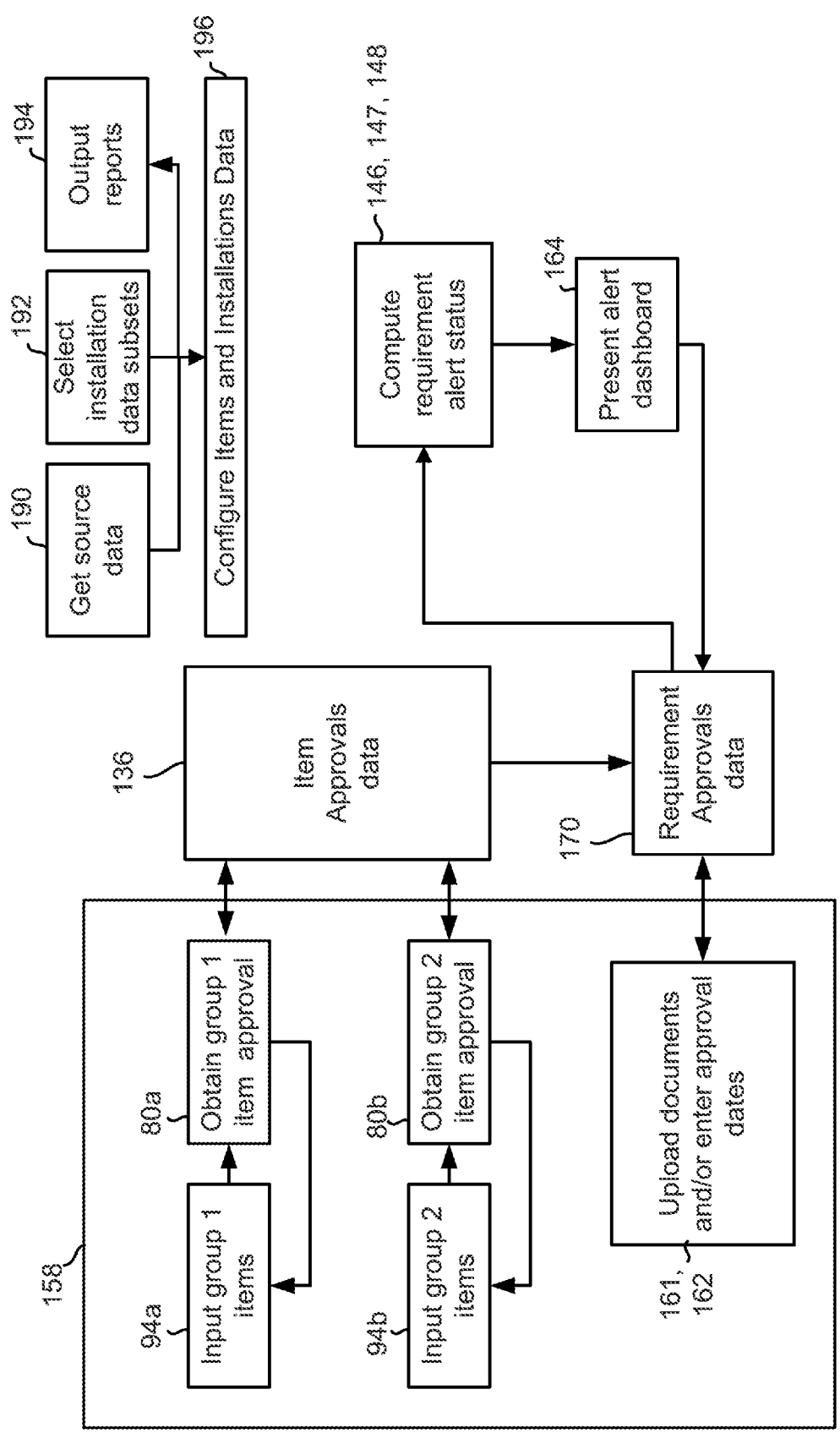
FIG. 9 is a block diagram illustrating a method performed in the computing system of FIG. 1 with sequential and event-driven project management algorithms.

FIG. 9 is a block diagram of an algorithm having processing sequences for executing a process which combines the event-driven and sequential approval processes. The algorithm may include the algorithms described with reference to FIGS. 2, 3 and 6 described above. At 196, items and installations are configured. Configuration entails defining pipes approvals and contacts, items, installations and other data as previously described with reference to FIGS. 2-8. Source data is received at 190 and at 192 a user may, optionally, select installation subsets using, for example, workload planner dashboards as described below. At 194, a user may produce a plurality of reports based on the configuration data. After the system is configured, at 146, 147 and 148 the alert status for each event-driven requirement is computed. At 164 an alert dashboard is presented such as the one described with reference to FIG. 10. Upon sensing the alert status of requirements for each of a plurality of installations, an authorized user may override alert status by setting alert indicators to selected alert levels. The alert indicator data is stored in a data structure containing requirement approvals data, exemplified as data structure 170. At 160, 162, event-driven process requirement approvals may be obtained in the manner described previously with reference to FIGS. 2-8, and the approval dates stored in data structure 170. Blocks 94a and 80a, and at 94b and 80b, illustrate processing steps performed by submodules 80 and 94 for group 1 and group 2 items. The final approval of each of the items are stored in an approvals database, for example a database comprising data structure 136. In one embodiment, the item approvals may automatically flow into data structure 170. Alternatively, a user may upload an authorization document related to an item to fulfill an event-driven requirement.

Figure 10:
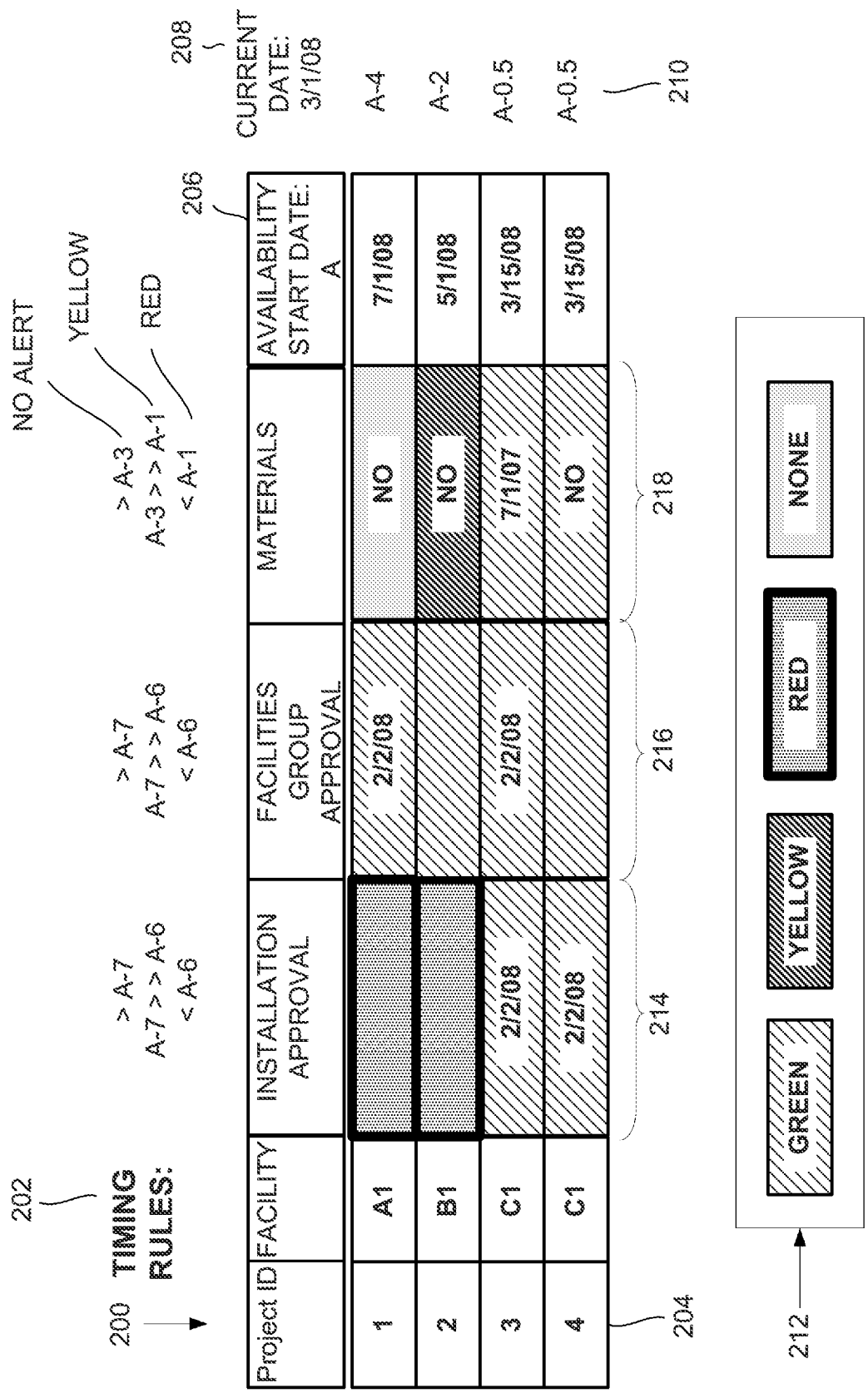
FIG. 10 is a conceptual diagram of a dashboard resulting from the execution of the system of FIG. 1.

The following figures illustrate the operation of the approval processes in relation to GUI which may be used to configure the processes, obtain user inputs related to items and requirements, generate reports and provide additional functionality based on the project data. FIG. 10 is a block diagram showing a conceptual project management display and exemplary timing-based alert rules and color-coded indicia. Chart 200 shows at a glance the alert status of various event-driven process requirements exemplified in columns named installation approval 214, facilities group approval 216, and materials approval 218. Alert rules 202 include three timing rules in each of three columns. The top rule reflects no alert, the middle rule generates a yellow alert, and the bottom rule generates a red alert. Project ID column 204 lists projects 1, 2, 3 and 4. Availability start date column 206 shows the availability start date of facilities A1, B1 and C1. An availability date is a target date which system 10 uses to determine alert status. Projects 3, 4 are designated for installation in facility C1. Current date 208 is used to produce coded current date 210 for each project by subtracting current date 208 from the availability date ("A" in months) of the facility and expressing the difference as "A–X" where X is a number of months. Legends 212 include status alert indicators, e.g. green, yellow and red. The coded dates are compared to the alert rules to generate alert status based on facility availability which enables presentation of multiple projects in potentially multiple facilities with varying availability dates in a single display and allow a project manager to identify, at a glance, which requirements require attention.

Chart 200 also shows that installation approvals for projects A1 and B1 require immediate attention (red alert) while the materials requirement for project B1 requires attention (not immediate attention). The remaining requirements do not show alerts. The alert process enables management of multiple projects at a glance, without the need to understand the technical requirements of the underlying project. Following the alert rules, project 1 is at A–4 so the installation approval requirement has a red status alert indicator because approval was not received (no date is shown) yet at A–4. Facilities group approval has a green status alert indicator because, although approval was provided on Feb. 2, 2008 (A–5), the requirement has been satisfied and it no longer represents risk of delay. The materials requirement is a requirement that responsibility for necessary materials be transferred to the installation team. No status alert indicator is necessary until A–3. Project 2 is at A–2 so the installation approval requirement has a red status alert indicator. Facilities group approval has a green status alert indicator suggesting the requirement was satisfied but no date is provided, indicating that the automatic alert process was manually overridden. The materials requirement has not been satisfied at A–2, therefore a yellow status alert indicator is shown. All requirements for project C1 have alert status green since they are complete, as evidenced by the completion dates. All requirements for project C2 have alert status green even though facilities group approval and materials approval was not received. This illustrates a rule of priority which may be applied when an authorization requirement has priority over other requirements. In this example, once installation approval is complete, all of the requirements show green status.

Modules 14, 16, 18 and other programs described herein are not limited to implementations in specific hardware or database structures. The terms computer and computing system are used interchangeably to signify a system such as system 10 comprising a processing unit, computer-readable media, input/output devices, and programs stored in the computer-readable media operable to cause the processing unit to perform a function using the input/output devices. A program, application, or computer program is here, and generally, conceived to be a sequence of computer instructions representing steps of methods for achieving desired results. A program may include a plurality of sequences organized in one, but generally more, program files, and may comprise program modules such as modules 14, 16 18 which are also referred to as programs. In other words, the term "program" is not limited to a singular form or manner of grouping computer instructions. Instead, program refers to the sequences necessary to perform the program's function. The instructions are processed by a computer and require physical manipulations of physical quantities. Usually, though not necessarily, these quantities take the form of electrical or magnetic signals capable of being stored, transferred, combined, compared, and otherwise manipulated.

Programs may use data structures for both inputting information and producing the desired result.

Data structures 134, 136, 170 and 172 impart a physical organization on the data stored in computer memory and greatly facilitate data management. A data structure is a physical or logical relationship among data elements, designed to support specific data manipulation functions. The actual physical implementation of a data structure may take several forms, from complete individual records storing the substantive information with several key indexes for locating a particular record, to a plurality of tables interrelated by relational operations, to a matrix of cross-linked data records, to individual variables indexed directly or indirectly, to various combinations and hybrids of these general types. In particular physical devices, a database may be structured and arranged to accommodate the restrictions of the physical device but, when transferred to a general purpose computer, the database may be able to be stored in a variety of formats. Thus, while certain types of information may be described as being stored in a "database" or in a "data-structure" from a conceptual standpoint, generally such information may be electronically stored in a variety of ways with a variety of encoding techniques.

Input/output devices such as I/O 40 include display devices, printers, and user input devices. Display devices include video screens, projectors and monitors. A display device may comprise a plurality of monitors coupled to a video output card, computer or server such that each monitor displays a portion of a graphic display and together the plurality of monitors display the entire graphic display. A display device may also comprise a plurality of monitors coupled to disparate video drivers which are coordinated to display an integral graphic interface. An input device may comprise a mouse, a keyboard, a software recognition system, a touch-screen, a track-ball, a hybrid device including more than one aforementioned devices, and the like.

A graphic display refers to pixel data used to present an image on an output device. Generally, an application writes images in the form of pixel data to a memory array or frame buffer and provides the frame buffer data to the output device for presentation. Raster scanning is the most common method of image transmission to an output device. The graphic display may comprise display objects having images representing the shape, color, style, and other characteristics of the object. Graphic images may also represent text. Some display objects may be activated with an input device, such as by clicking, mouse-over and the like, to cause performance of a programmed function.

System 10 may include a variety of computer-readable media. Computer-readable media can be any available media that can be accessed by the computing system and includes both volatile and non-volatile media, and removable and non-removable media. Computer-readable media may comprise computer storage media to provide storage of computer-readable instructions, software applications, data structures, program modules and other data for the computing device. For simplicity and without limiting the disclosed embodiments to any particular physical embodiment of a computer-readable media, computer-readable media is referred to herein as "memory" in singular form to represent one or more discrete physical media. Thus, memory includes a harddisk, a plurality of harddisks, a combination of a harddisks and one or more of an optical disk such as a CD or DVD, a flash-drive, and a diskette, and any other media combination. The physical embodiment of the media may comprise local components and remote components accessible through a network and/or the internet.

A computing system may operate in a network environment using logical connections to one or more remote computers. The remote computer may be a personal computer, a server, a network PC, and typically includes many or all of the elements described above. The logical connections include a local area network (LAN) and a wide area network (WAN), but also include other networks. The terms "network," "local area network," "LAN," "wide area network," or "WAN" mean two or more computers which are connected in such a manner that messages may be transmitted between them. Such network environments are commonplace in office, enterprise-wide computer networks, Intranets, and the Internet. In such computer networks, typically one or more computers operate as a "server," a computer with resources such as large storage media and communication hardware to operate peripheral devices such as printers or modems. Other computers, termed "clients" or "workstations," provide a user interface so that users of computer networks can access the network resources. The computers have at least one processor for executing machine instructions, and memory for storing instructions and other information.

Table 1 illustrates project data categories and descriptions which are displayed in various forms, reports, dashboards and GUIs.

TABLE 1

| Label | Description |
| --- | --- |
| Alt Identifier | Alteration identifier |
| Alt Num | Alteration number |
| Alt type | Type of alteration |
| Avail End | Last day of facility availability |
| Avail Start | First day of facility availability |
| Avail Location | Location of the facility during the availability time |
| Baseline | Standard installation configuration |
| CDMDOA Status | Configuration status |
| Conj Alt | Conjunctive alteration |
| Ship | Name of facility |
| ILS Date | Integrated logistics support date |
| LOA | Letter of authorization |
| MATL Status | Material status |
| Region | Region where facility is located during the availability time |
| SIDS Approved | Installation drawings status |
| RMMCO Complete | Regional office status |

Menus, reports and other objects may be generated by any known web page creation programs. The following descriptions may be based on nautical terms representative of a naval fleet, but the invention encompasses any type of facility and facilities group planning. Regional categories such as Atlantic and Pacific may be any category to create data subsets suitable for the organizational objectives. The term "ship" may, likewise, be substituted by terms like mfg. plant, site, facility, unit, and the like.

Figure 11:
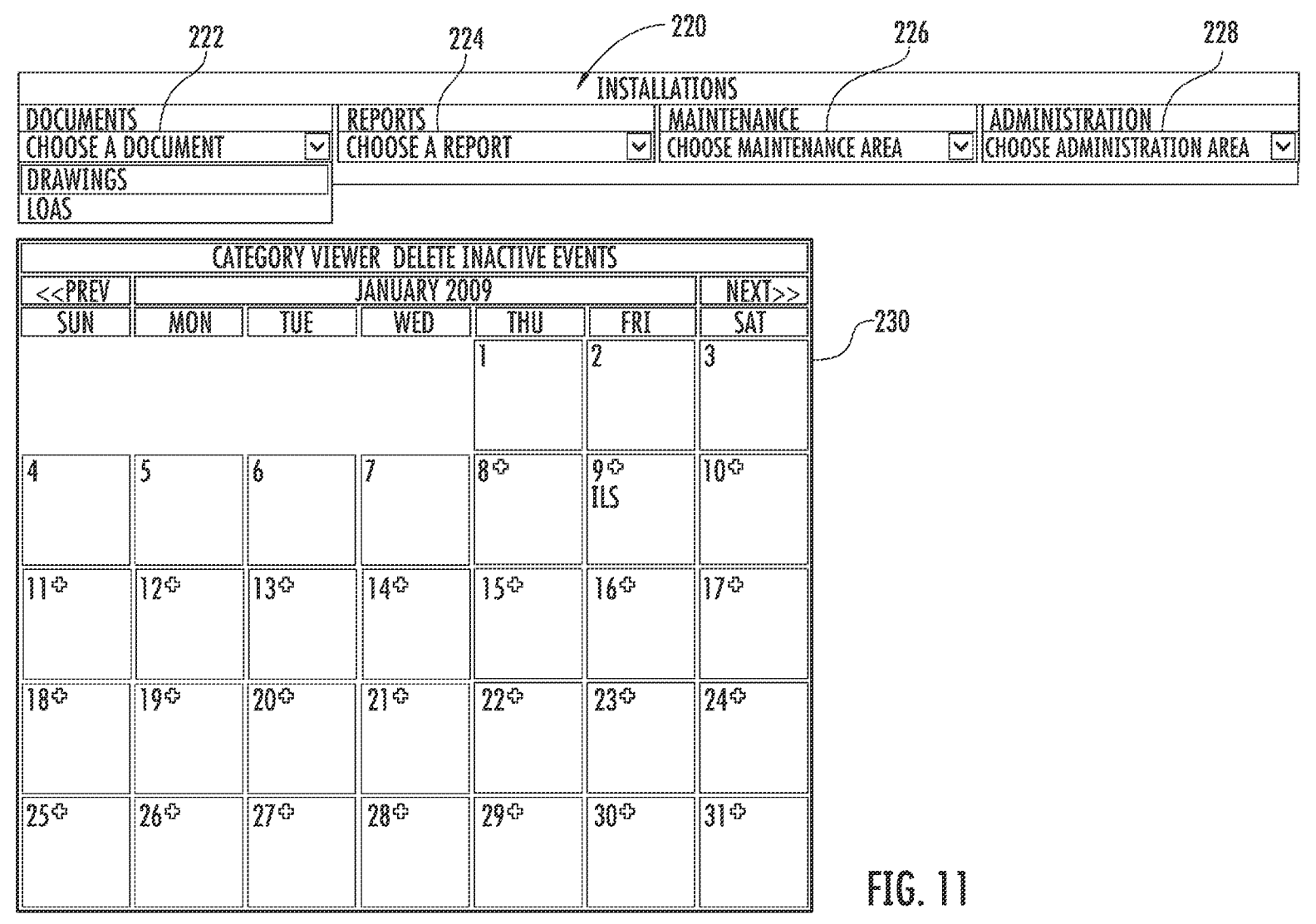

An exemplary installations GUI 220 is shown in FIG. 11 comprising documents menu 222, reports menu 224, maintenance menu 226, and administration menu 228. GUI 220 is pushed by installations module 14 and is structured to facilitate management of installations data. Similar GUIs are provided by logistics module 16 and inventory module 18 to manage logistics and inventory data. Calendar 230 is provided for scheduling personal calendar activities and function similarly to commonly used calendars such as MICROSOFT™ Outlook. For instance, a calendar day may be double-clicked to add an appointment scheduled for the selected day. The menu options of documents menu 222 are also shown. A user activates the menu to choose from lists of documents to present project data. Like-named submodules perform the functions listed in the menu, e.g. LOAs and Drawings. Selection of LOAs displays a selection box (not shown) to enable selection of an LOA document based on a selected installation. Likewise, specific drawings may be selected, e.g. facility, interface, installation drawings and the like.

Figure 12:
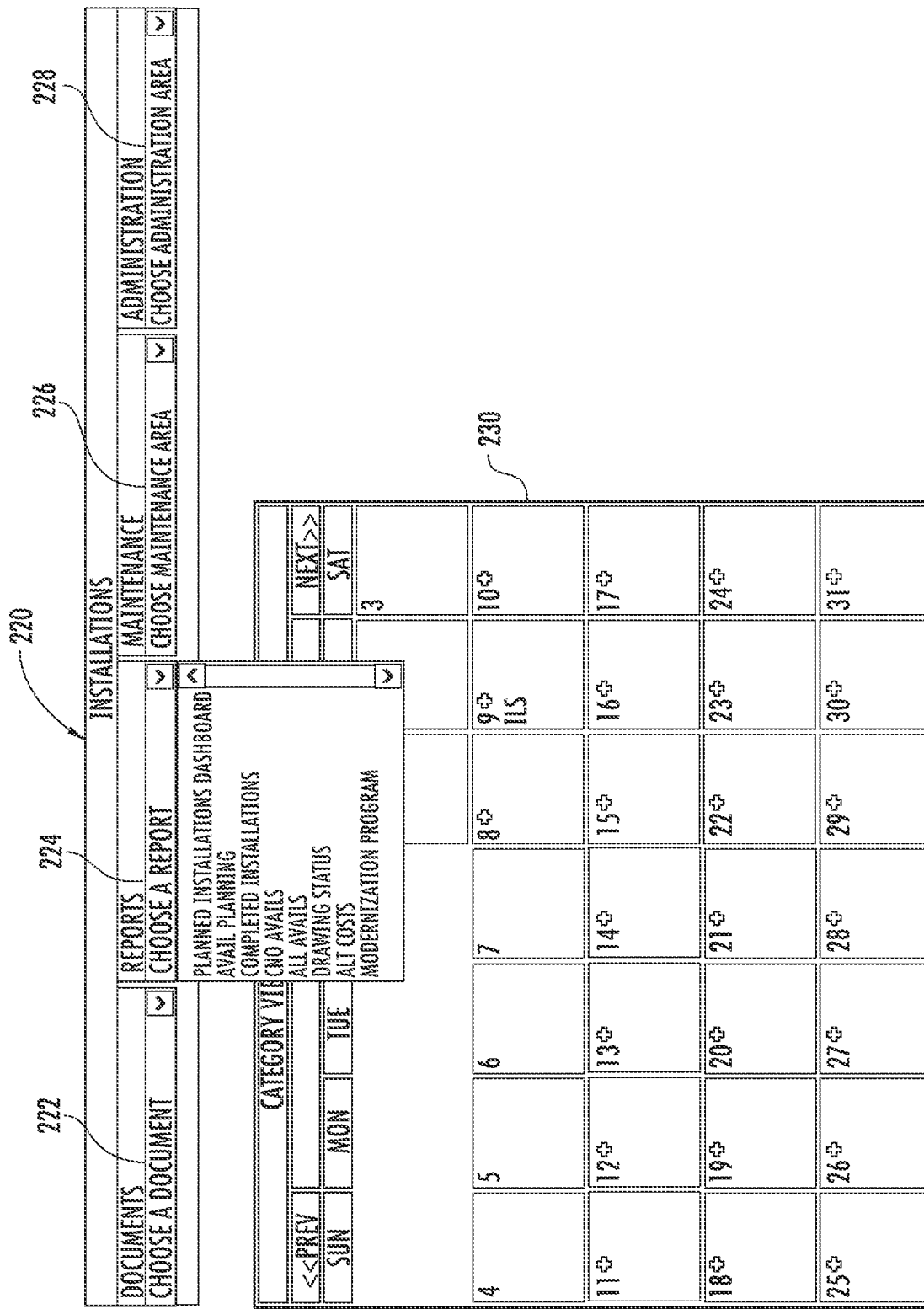

FIG. 12 is a screen shot of installations GUI 220 illustrating options of reports menu 224. A user activates the menu to choose from lists of reports and GUIs to present, edit, add and delete project data. A reports sub-module provides interactive dashboards and spreadsheet reports that allow authorized users to track the significant dates, planning milestones and cost status for projects to be installed in selected facilities, field changes, and delivery dates. Exemplary reports include Planned Installations Dashboard, Avail Planning, Completed Installations, All Avails, Alt Costs Report and the like. In addition to dashboards and reports concerning project status, additional reports may be provided to assess the performance of the aggregate project planning system. For example, a report may be provided to describe phases of modernization programs and other programs which fund the projects to be managed by the system provided herein. In one report, there are several phases and each phase has an approval date. More than one phase may be approved in one day. The phase approval dates may be provided in the source data described with reference to FIG. 1. While the project management system provided herein does not facilitate management of phases, the system may calculate the time between phase approvals. In doing so, the system may compare dates to determine when more than one phase was approved in a single day, and may compare the phase approval dates to the project completion dates to report on the total time required to implement projects funded by the different phases and thereby facilitate improvement of the overall funding and project management activities from funding to completion of the approval process, and then to completion of the implementation of the project.

Figure 13:
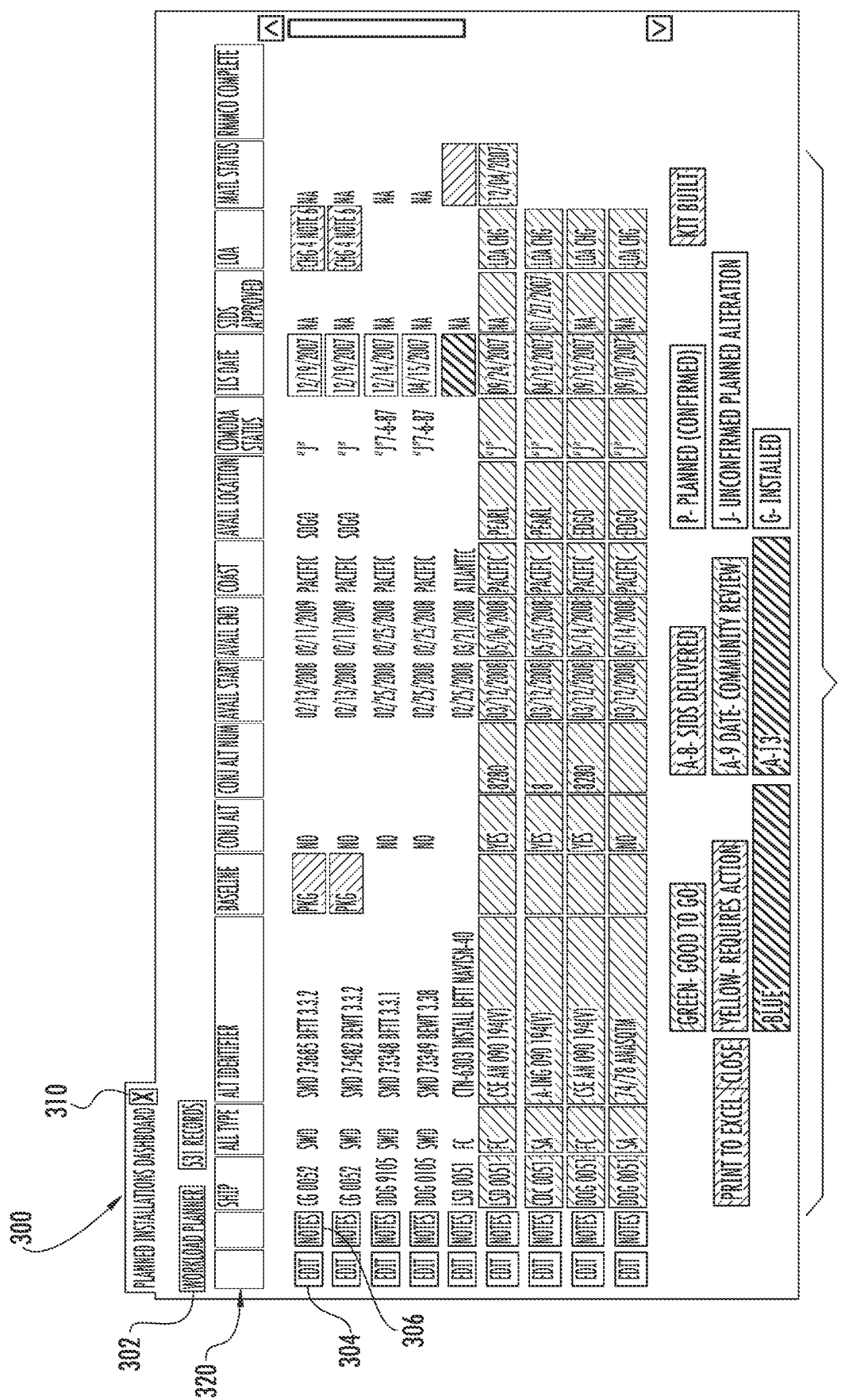

FIG. 13 is a screen shot of an exemplary planned installations dashboard 300 including a plurality of color coded cells disposed in rows and columns providing the process approval dates and planning milestone status. Dashboards present aggregate project process requirements for at-a-glance inspection to assist an installations manager to determine where to focus resources. Dashboard data may be provided from data structures 170, 172. As in FIG. 10, rows represent projects. A number of buttons are provided to drill down into selected projects and to manipulate project data. Workload planner button 302 initiates a dialog for selecting subsets of the data shown. Edit button 304 presents a planned installations edit form which provides a synopsis of the data in the row associated with the button and the ability to edit the data. Other means for selecting a row for editing include checkboxes, numbered lists where selection of a number identifies a selected row, and the like. The dialog allows editing of text data corresponding to REQUIREMENT and installation fields which may be included in data structures 170, 172 such as baseline, ILS, SIDS approved, LOA, RMMCO complete, and other data. Each of the fields may have a corresponding REQ' APPROVAL DATE and ALERT INDICATOR containing the date when the requirement was approved as well as the selected alert indicator level. Indicators may be stored in rows corresponding to requirements in data structure 172 or may be stored in fields corresponding to installations or in both. Exemplary installation indicator fields include ILS_color, SIDS_approved_color, RMMCO_complete_color, etc. Notes Button 306 initiates a dialog to append notes to a project. Cells are color coded according to rules described below. Legend 308 indicates the significance of different colors, where green indicates a project is ready for implementation, yellow indicates actions are required to achieve readiness, red indicates immediate action is required, blue indicates delivery and completion of various documents, checks and reviews, white indicates status such as confirmed, planned but unconfirmed, and installed, and gold indicates a kit has been built. Icon 310 may be activated to initiate downloading of project data in a format readable by a third party program. Exemplary programs include spreadsheet, database and document creating programs.

Column category labels named according to the project data categories in the respective columns are shown in row 320. The labels include, from left to right, Facility, Alt Type, Alt Identifier, Baseline, Conj Alt, Conj Alt Num, Avail Start, Avail End, Region, Avail Location, CDMDOA Status, ILS Date, SIDS Approved, LOA, MATL Status and RMMCO Complete. Some project data identifies facilities, facility classes, and the like. Other project data identifies the completion date of tasks. Other project data indicates the status of a task or facility. In alternative embodiments, status codes may replace completion dates and vice-versa.

The color coding scheme of planned installation dashboard 300 cells is determined by alert rules predetermined to address a desired level of installation delay risk. The color of a cell or row is based on the status of a performance indicator which may be set based on events or override selections. An event may include uploading an LOA for the Ship and Alteration ID or uploading certification, quality control and other documents. In the embodiment shown, the LOA document is tied to the LOA Column. When an LOA is uploaded, a dialog enables a user to select Ship and Alt ID which selects a row. The selection ties the LOA to the LOA column and specified row and sets the approval date for the requirement. The SCD document is tied to the Alt ID and linked on Alt Number. The CDMDOA document is tied to CDMDOA Status and linked on Ship and Alt ID. The ILS Cert document is tied to the ILS Date and linked on Ship and Alt ID. The Materials report is tied to Matl Status and linked on Ship and Alt ID.

Overrides may include cell and row overrides. An override occurs when a user sets an alert indicator to a level which is different from the level calculated based on the target date and the current date. For example, an installation with status pending may have a yellow cell color, but the color green may be shown instead by setting the corresponding indicator to "approved." Similarly, a row override occurs when a requirement with high importance is overridden which, in this exemplary embodiment, sets the alert level for all requirements with lower importance. An LOA may be the high importance requirement and, upon receipt of an LOA approval, all the cells in the corresponding row may be set to the approval color, e.g. green. The background color of the Notes Button may be changed from gray to aqua if a note which applies to the Ship and Alteration ID for the row has been added or edited recently, e.g. in the last 168 hours or seven days. Exemplary alert status rules for rows and requirements such as LOA, Baseline, ILS_Date, SIDS_Approved, Matl Status and RMMCO are shown below in TABLES 2-7.

TABLE 2

Exemplary Rules for Setting Row Color

| Rules | Color |
| --- | --- |
| Authorization LOA uploaded; or<br>LOA_color value set to Green; or<br>Authorized user is logged on and the RMMCO<br>Complete field contains a date | Green |
| Default | Gray |

TABLE 3

Exemplary Rules for Setting LOA Cell Color

| Rules | Color |
| --- | --- |
| Authorization LOA uploaded; or<br>LOA_color value set to Green | Green |
| Pending LOA uploaded; or<br>LOA_color value set to Yellow | Yellow |
| Deferred LOA uploaded; or<br>LOA_color value set to Red | Red |
| Default | Gray |

A baseline is a specification applicable to a class of facilities used to track whether a facility has been upgraded according to a modernization program, for example. The first facility specification defines the baseline and baseline date. As the baseline is changed over time, the baseline date changes. Installation and project codes are compared to baseline dates to recognize if a facility has been upgraded to the current baseline. If it has not, then a particular installation kit designed to be installed in a baselined facility may not be suitable.

TABLE 4

Exemplary Rules for Setting Baseline Cell Color

| Rules | Color |
| --- | --- |
| Authorization LOA uploaded; or<br>LOA_color value set to Green; or<br>Baseline_color value set to Green | Green |
| Default | Gray |

Uploading the ILS document provides the ILS approval date. No date is provided if the ILS document is not uploaded. Generally, it is desirable to achieve the ILS milestone months before the date when a ship (facility) is scheduled to go offline and become available for certain installations. In this example, the target date for ILS completion is before A–7 (months). If ILS is not completed between A–6 and A–7 (months), the installation may be jeopardized so the alert is raised by changing the cell color from green to yellow. Likewise, it is raised to red if ILS is not completed between A–6 and A–0. Alert timing depends on the complexity of the facilities group, parts availability and uniqueness, cost of delay, and so forth, and may be greater or less than the time durations described herein.

TABLE 5

Exemplary Rules for Setting the ILS Date Cell Color

| Rules | Color |
| --- | --- |
| Authorization LOA uploaded; or<br>LOA_color value is set to Green; or<br>ILS Certification Document previously<br>uploaded, which is evident when<br>the field contains uploaded date information; or<br>ILS_Date_color value is set to Green | Green |
| The present date is between 6 and 7 months<br>before the Avail_Start_Date<br>value and the ILS Certification Document was not uploaded; or<br>ILS_Date_color value is set to Yellow | Yellow |
| The present date is between 6 months and<br>the Avail_Start_Date value and<br>the ILS Certification Document was not uploaded; or<br>ILS_Date_color value is set to Red | Red |
| Default | Gray |

The SIDS approval date is the date when facilities management approves the installation drawings. If the field is blank, then the cell color may be changed by completing a check of the ship (facility) and a community review. This procedure reflects dual or multiple lines of responsibility. Facility management may provide approval up the line management and the approval is then communicated to the installation organization (often referred to as corporate or plant engineering staff) which is reflected in source data. Alternatively, field checks may be performed which may require both line management and installation staff agreement. Also, delivery of the SIDS document may mitigate risk further. Some projects may involve equipment, software, training and other tasks which do not require alteration of a facility. An appropriate code may be provided in the alteration_type field to identify whether a project is such a project and to designate that a SIDS procedure is not required to be followed.

TABLE 6

Exemplary Rules for Setting the SIDS Approved Cell Color

| Rules | Color |
| --- | --- |
| Authorization LOA uploaded; or<br>LOA_color value is set to Green; or<br>Alteration_Type value equals "SA" and SIDS_Date<br>value is a valid date; or<br>SIDS_Approved_color value is set to Green | Green |
| Alteration_Type value equals "SA" and SIDS_Date<br>value is not a valid date; or<br>SIDS_Approved_color value is set to Yellow | Yellow |
| Alteration_Type value equals "SA", SIDS_Date value<br>is not a valid date, Shipcheck value is a valid date,<br>Community_Review value is NULL, and<br>SIDS_Delivered value is NULL | Pale Blue |
| Alteration_Type value equals "SA", SIDS_Date<br>value is not a valid date, Community_Review value is<br>a valid date, and SIDS_Delivered value is<br>NULL | Sky Blue |
| Alteration_Type value equals "SA", SIDS_Date<br>value is not a valid date,<br>and SIDS_Delivered value is a valid date | Light Blue |
| Alteration_Type value equals "SA" and SIDS_Date<br>value is not a valid date; or<br>SIDS_Approved_color value is set to Red | Red |
| Default | Gray |

The Matl Status cell identifies the status of materials and material kits necessary to perform an installation to mitigate installation delay risk due to parts unavailability at the critical time. A materials document is a document used to transfer responsibility for materials. A material "owned" by logistics, for example, may be transferred to a line organization and after the transfer the logistics organization no longer can use or transfer the material. This ensures that when materials are allocated by transfer to the installation organization, those materials will remain available. A kit is a group of materials handled by system 10 as a single item. A kit is built when the kit components are assembled. As with LOA and ILS milestones, time periods may be designated to set the alert status for materials.

TABLE 7

Exemplary Rules for Setting Matl Status Cell Color

| Rules | Color |
|---|---|
| Alteration type value is not "SWD" and materials document uploaded | Green |
| Alteration_Type value is not "SWD", Kit_Built value is not a valid date, present date is between 60 and 30 days before Avail_Start_Date value, and SIDS_Date value is not a valid date | Yellow |
| Alteration_Type value is not "SWD" and Kit_Built value is a valid date | Light Orange |
| Alteration Type value is not "SWD", Kit_Built value is not a valid date, and present date is between 30 and 0 days before Avail_Start_Date value | Red |
| Default | Gray |

The RMMCO Complete date represents another approval from another organization. e.g. a regional (Atlantic/Pacific) organization. A regional organization may have responsibility for groups of facilities. For example, a regional organization may control a warehouse, port or staging area and the related facilities (trucks, ships, IT hardware).

TABLE 8

Exemplary Rules for Setting RMMCO Cell Color

| Rules | Color |
|---|---|
| NDE_completed value is a valid date; or RMMCO_Complete_Color is set to green | Green |
| Default | Gray |

Selection of a readiness category button displays an Avail Planning Report including the requirements with the selected readiness level for the selected facility. Selection of a Move button moves the associated row data to a different readiness category.

The All Avails Report presents a list of all availability periods for facilities with availability. The data includes the availability dates, locations and types. The Completed Installations Report presents the status of projects installed in the indicated facilities within a selected timeframe such as last four months, last 6 months and so on.

Figure 14:
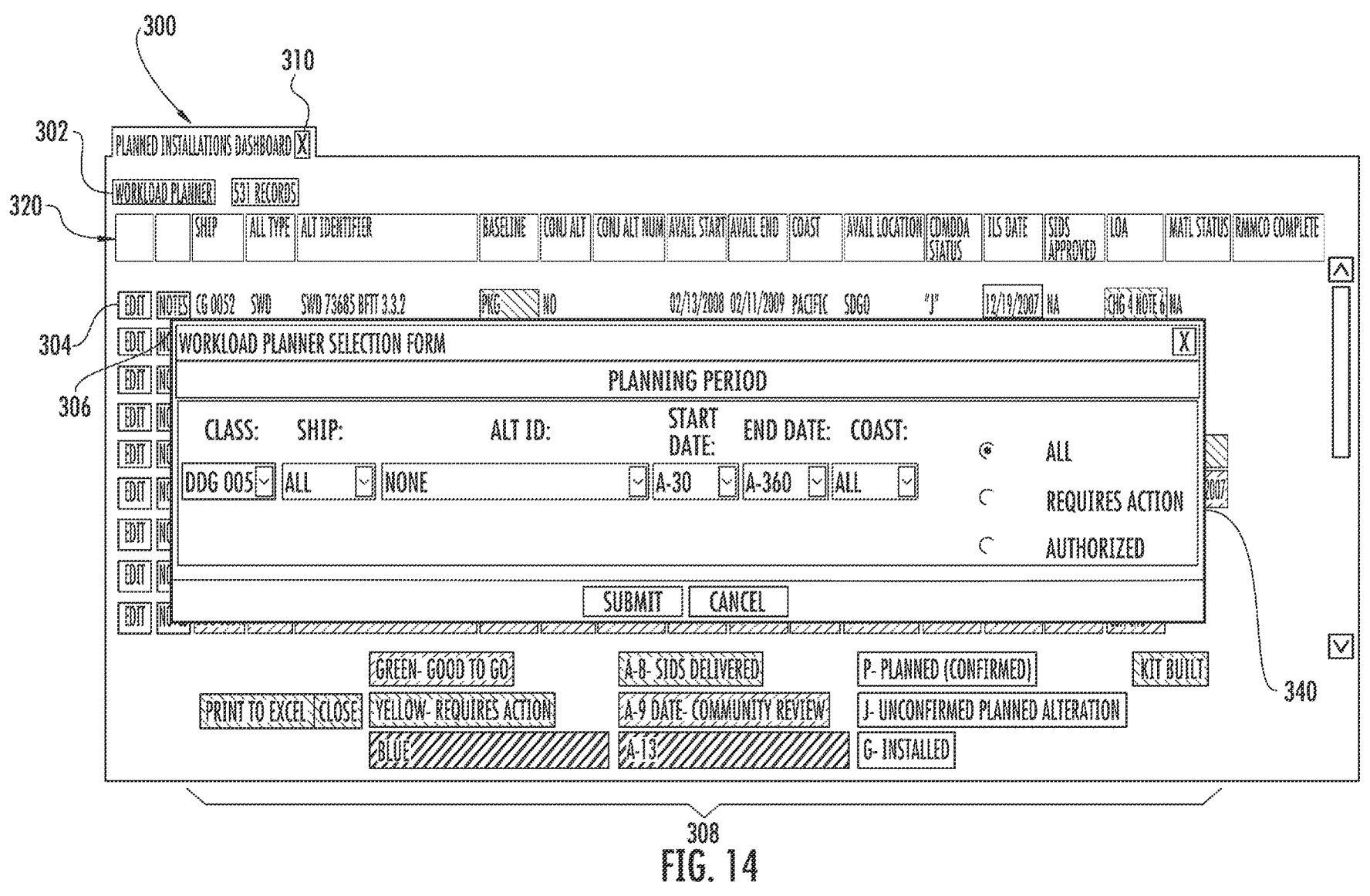

FIGS. 14 and 15 are, respectively, full and partial screen shots of workload planner dialog 340 initiated by activating workload planner button 302 and the resulting work load planner 350 page. Workload planner dialog 340 enables selection of class, ship, alt ID, start-end dates, region, and alert level to select a subset of all project data and to create a specialized report showing, for example, only those rows containing installation data for availabilities starting within a specified timeframe (i.e., A–0 to A–30 days) and/or occurring on specified geographical regions. Start and end dates are shown as A–30 and A–360 indicating selection of a period which is between a year and a month before the current date. As shown, the selection includes all projects to be installed in facilities in class DDG005 having activities dated between a year and a month prior to the current date, in all regions and regardless of alert level. FIG. 15 shows that the initial set of 531 records (shown in FIG. 14) was reduced by the selection to 46 records. Workload planner page 350 displays the same project data cells as planned installations dashboard 300 and, additionally, displays selection criteria box 360 showing the selection criteria selected in workload planner dialog 340.

Figure 16:
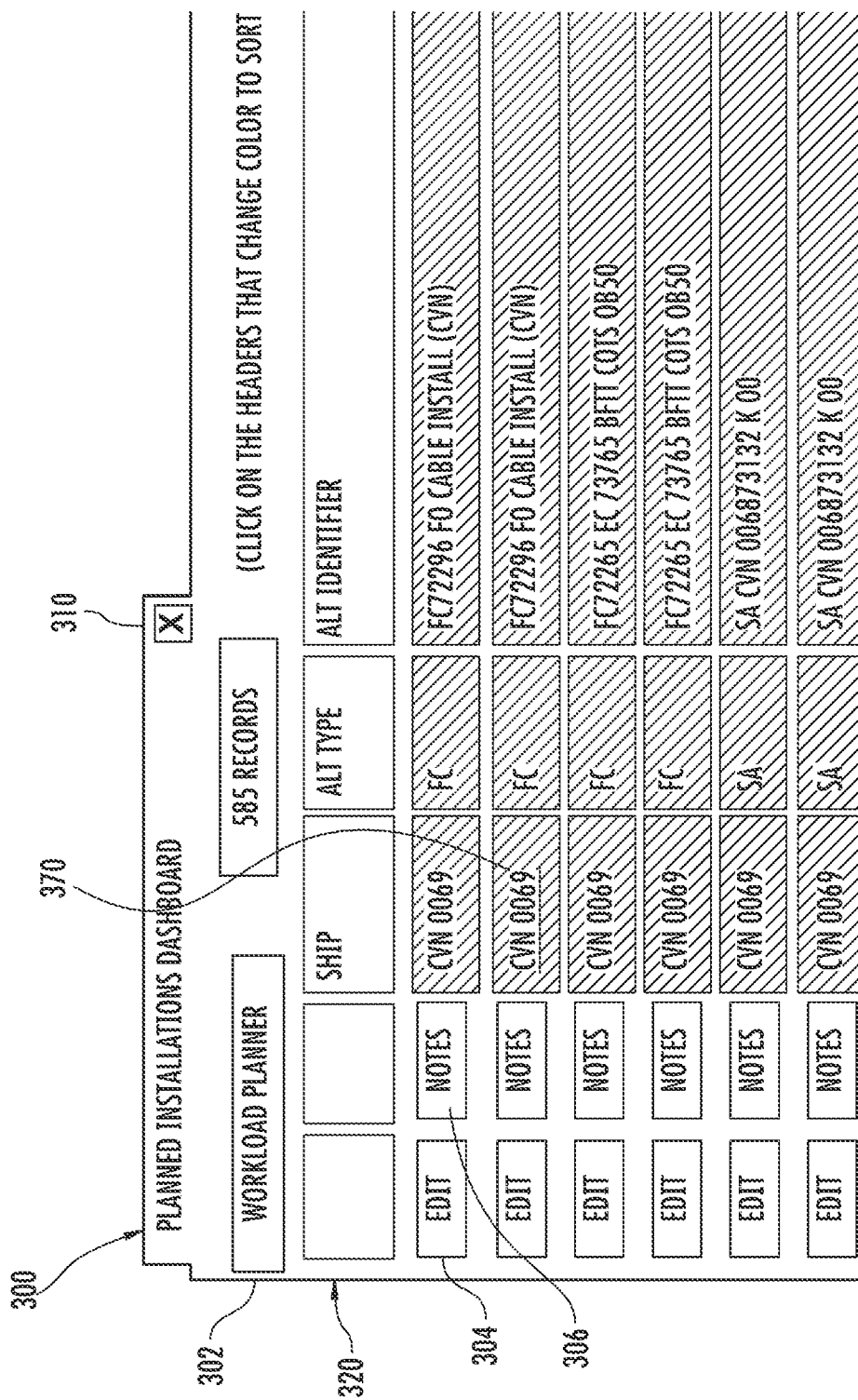

Uploaded documents are linked to cells in the manner previously described. FIG. 16 is a partial view of planned installations dashboard 300 showing hyperlink 370 in the ship column. The hyperlink is displayed on mouseover of a cell having a linked document. Clicking the cell produces the document. The Ship column has links to ship drawings, the LOA column has links to LOA documents, the Alteration ID column has links to alteration drawing documents, the CDMDOA Status column has links to CDMDOA documents, the ILS Date column has links to ILS Certification documents and the Matl Status column has links to materials documents.

Figure 19:
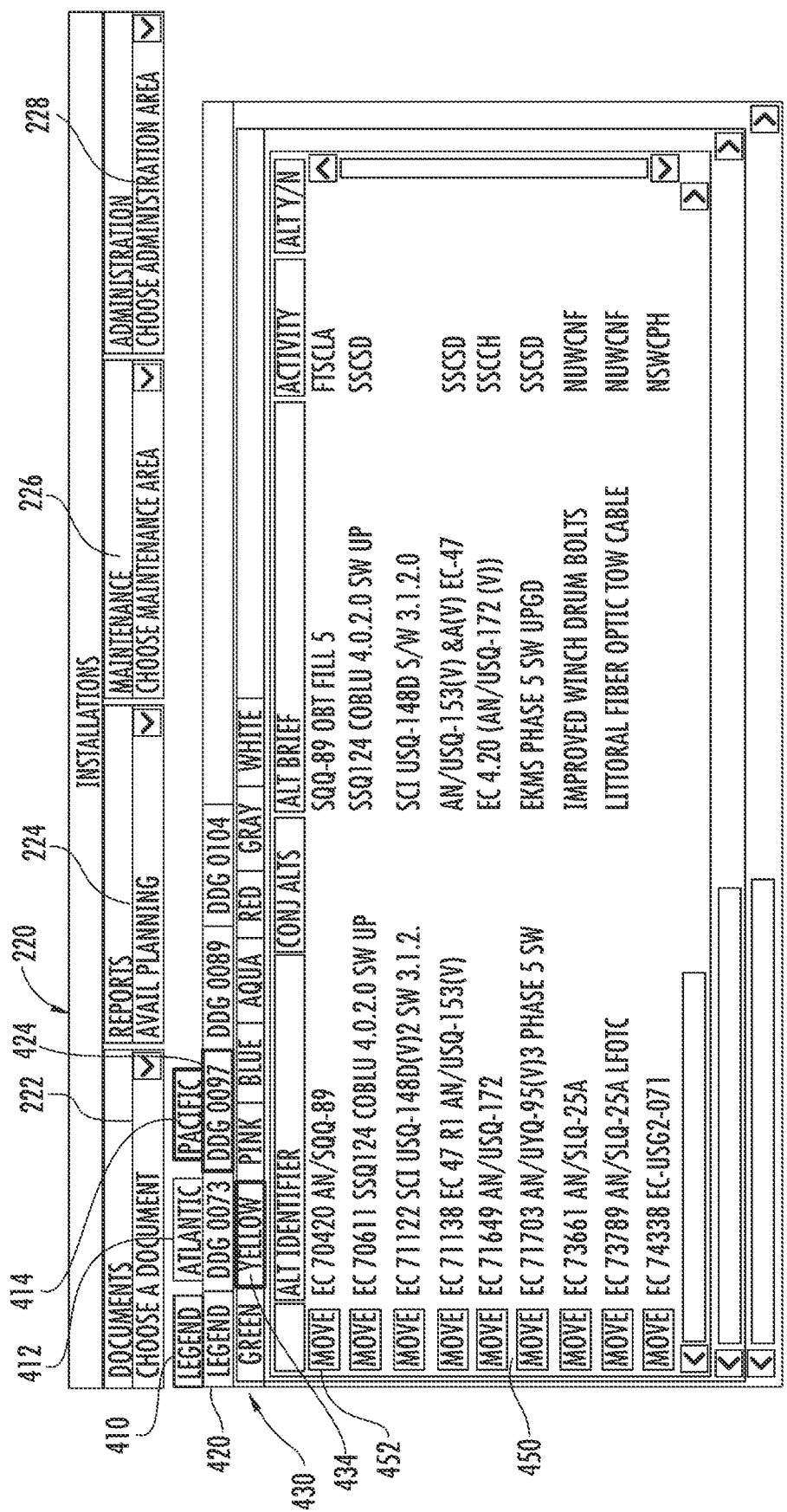
Figure 20:
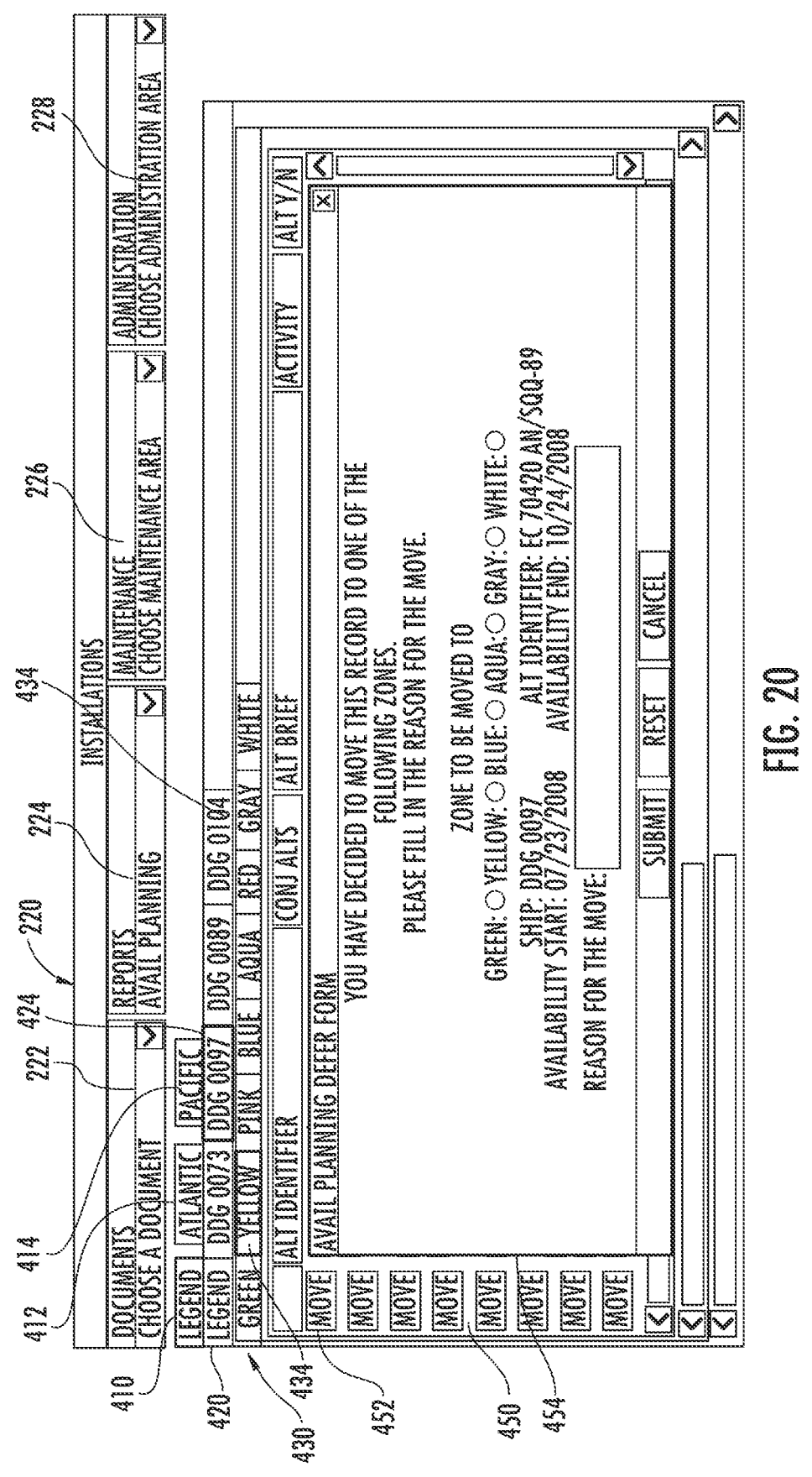

FIGS. 17 to 20 are screen shots of availability planning GUI 400 initiated from reports menu 224 and including class selection box 402 for selecting a subset of available ships and text box 404 for providing instructions, e.g. legends describing codes, acronyms and initialities. Upon selection of a class, e.g. DDG 0051, legend tab 410, Atlantic region tab 412 and Pacific region tab 414 are presented in FIG. 18 with legend tab 410 active displaying text box 416 containing, illustratively, legends similar to those in text box 404. FIG. 19 shows another set of tabs including legend tab 420 and a plurality of tabs situated to the right of legend tab 420 with names corresponding to ships located in the Pacific region during the availability period and including DDG 0073, DDG 0097, DDG 0089 and DDG 014. Pacific region tab 414 and DDG 0097 tab 424 are selected, which selection causes presentation of a third plurality 430 of tabs situated below the facility tabs with names corresponding to alert status (zones). Yellow tab 434 is selected which causes display of projects in project display area 450 corresponding to projects having yellow alerts. Any move button 452 may be activated to generate dialog 454, shown in FIG. 20, for moving a record from a yellow zone to another zone. A reason for the move may be provided.

FIG. 21 is a partial screen shot of completed installations report 490 initiated by selecting the report from reports menu 224. Drop list 492 is provided to select installations completed within specified time periods, e.g. during the last 4 months. Similarly, additional reports may be generated representing all or subsets of the project data.

Figure 22:
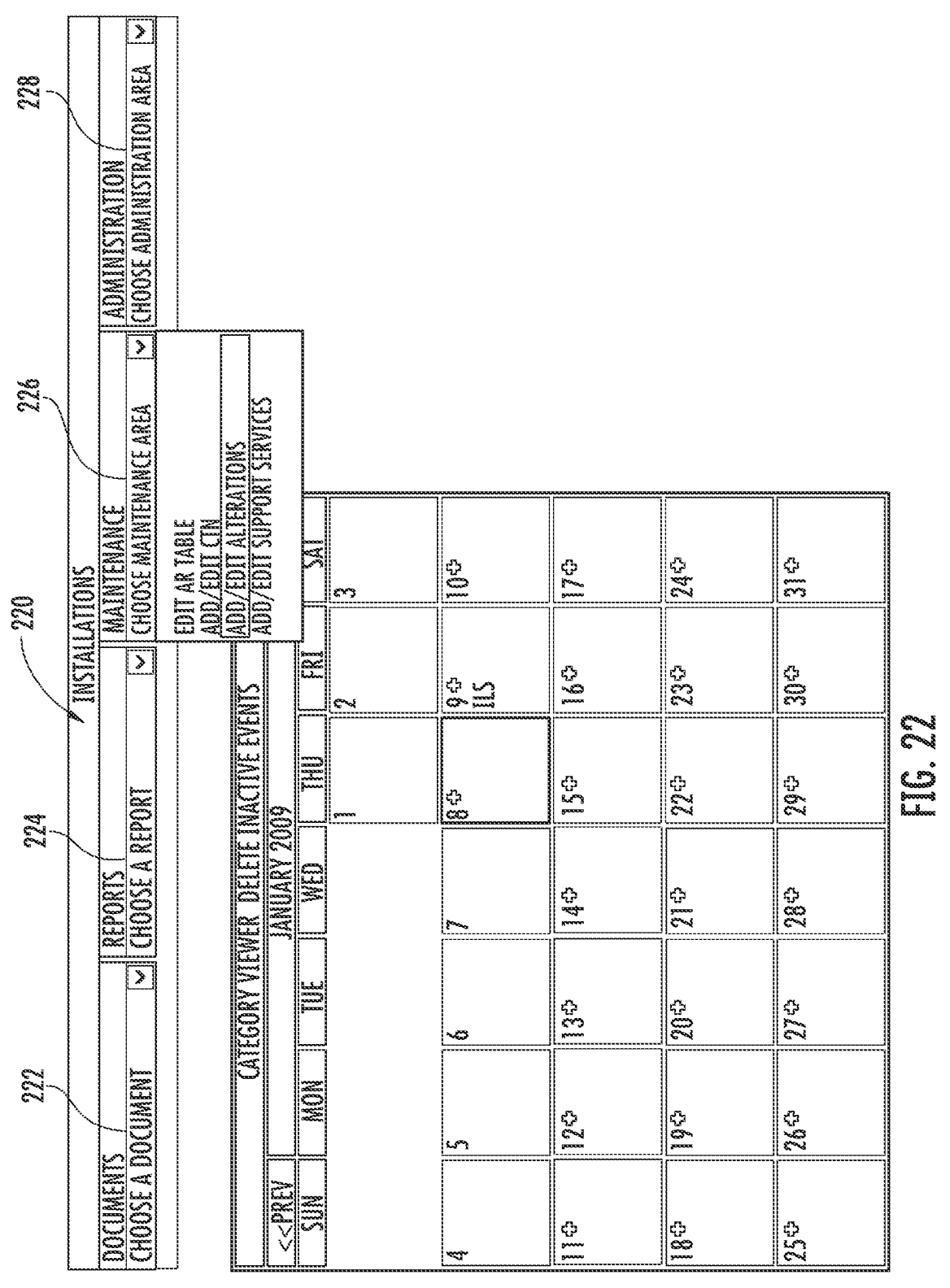

FIG. 22 is a screen shot of installations GUI 220 illustrating menu options of maintenance menu 226. A user activates the menu to choose from lists of reports and dialogs to present, edit, add and delete project data. A maintenance sub-module provides the capability to open forms to add or edit the data displayed in the various reports such as AR table, CTN, Alterations Support Services, and the like. A CTN or change tracking number is a four digit number assigned to an unapproved Alt. The CTN can be submitted for approval. Once approved and properly scheduled, the Alt will be reflected in source data as a five digit Alt number with the last four digits being the original CTN. The Alt number and associated data overwrites the CTN data which is then removed from the planned installations dashboard report.

Figure 23:
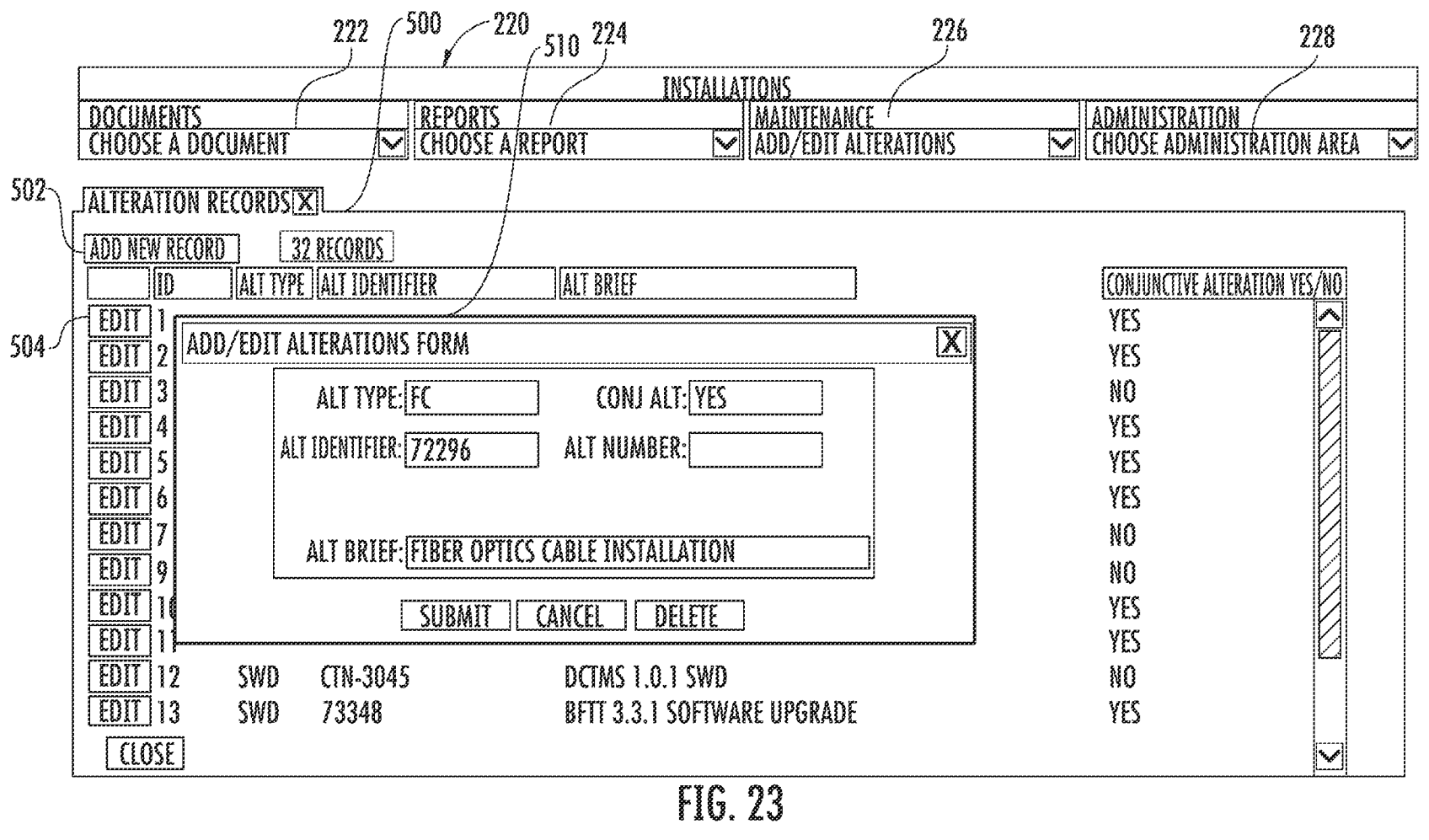
Figure 24:
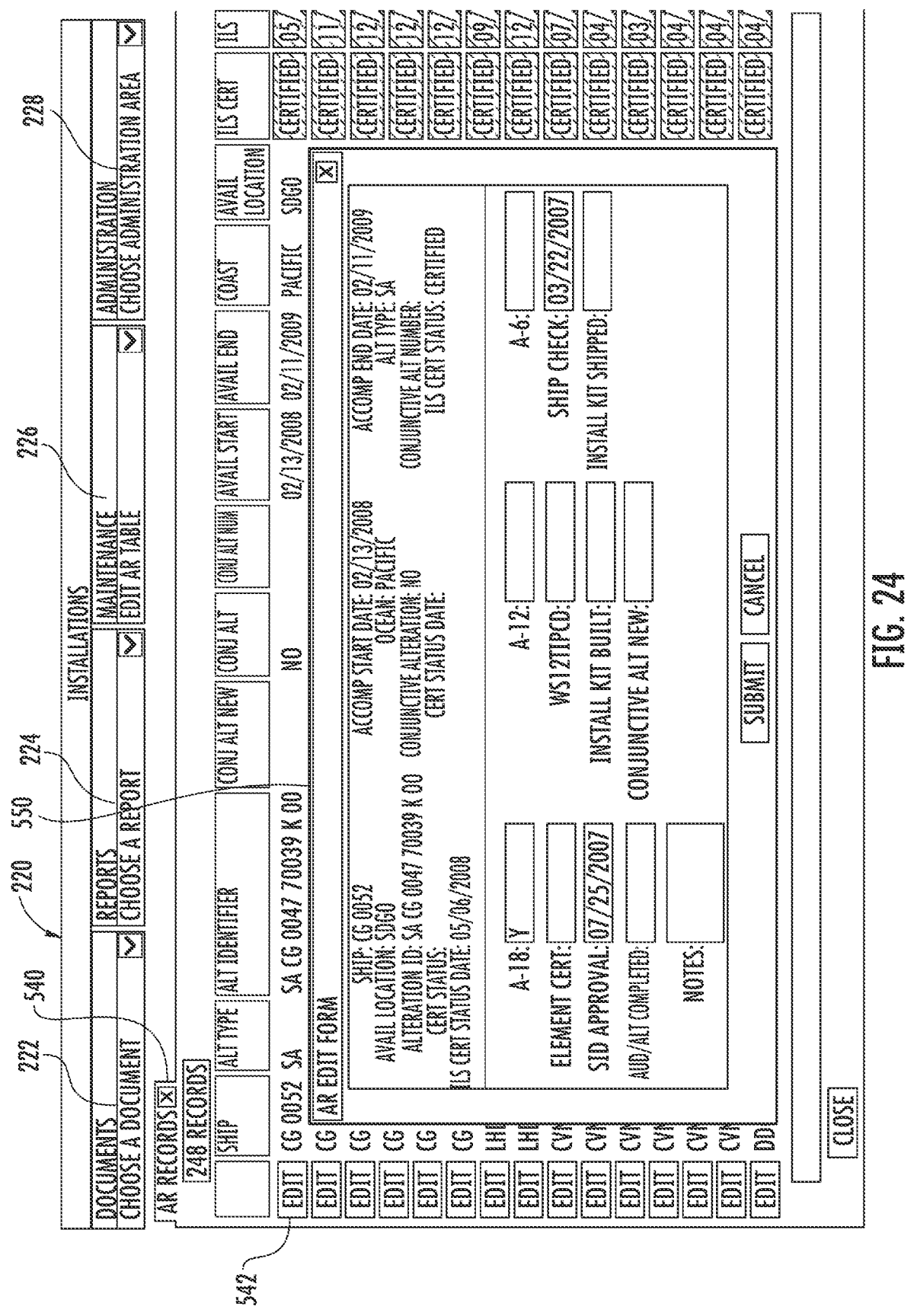

FIGS. 23 and 24 are screen shots of exemplary maintenance dialogs which may be selected from maintenance menu 224 for editing alteration records. FIG. 23 shows alteration records dialog 500 and alteration records form 510 which pops up when add new record button 502 or any one of a plurality edit buttons 504 is activated. Alteration records form 510 enables editing alt type, alt identifier, alt brief, conj alt, and alt number fields which are the fields shown in alteration records dialog 500 cells/columns. FIG. 24 shows AR Records dialog 540 and AR edit form 550 which pops up when any one of a plurality edit buttons 542 is activated. AR edit form 550 enables editing milestone data pertaining to an installation, in the selected case alteration (identifier) SACG 0047 70039 K 00 (top row) was selected. Editable fields are shown in 3 columns showing timing windows denoted by A−18 (present minus 18 months), A−12 (present minus 12 months), and A−6 (present minus 6 months). Similarly, the remaining maintenance menu 224 options may be used to edit subsets of project data.

Figure 26:
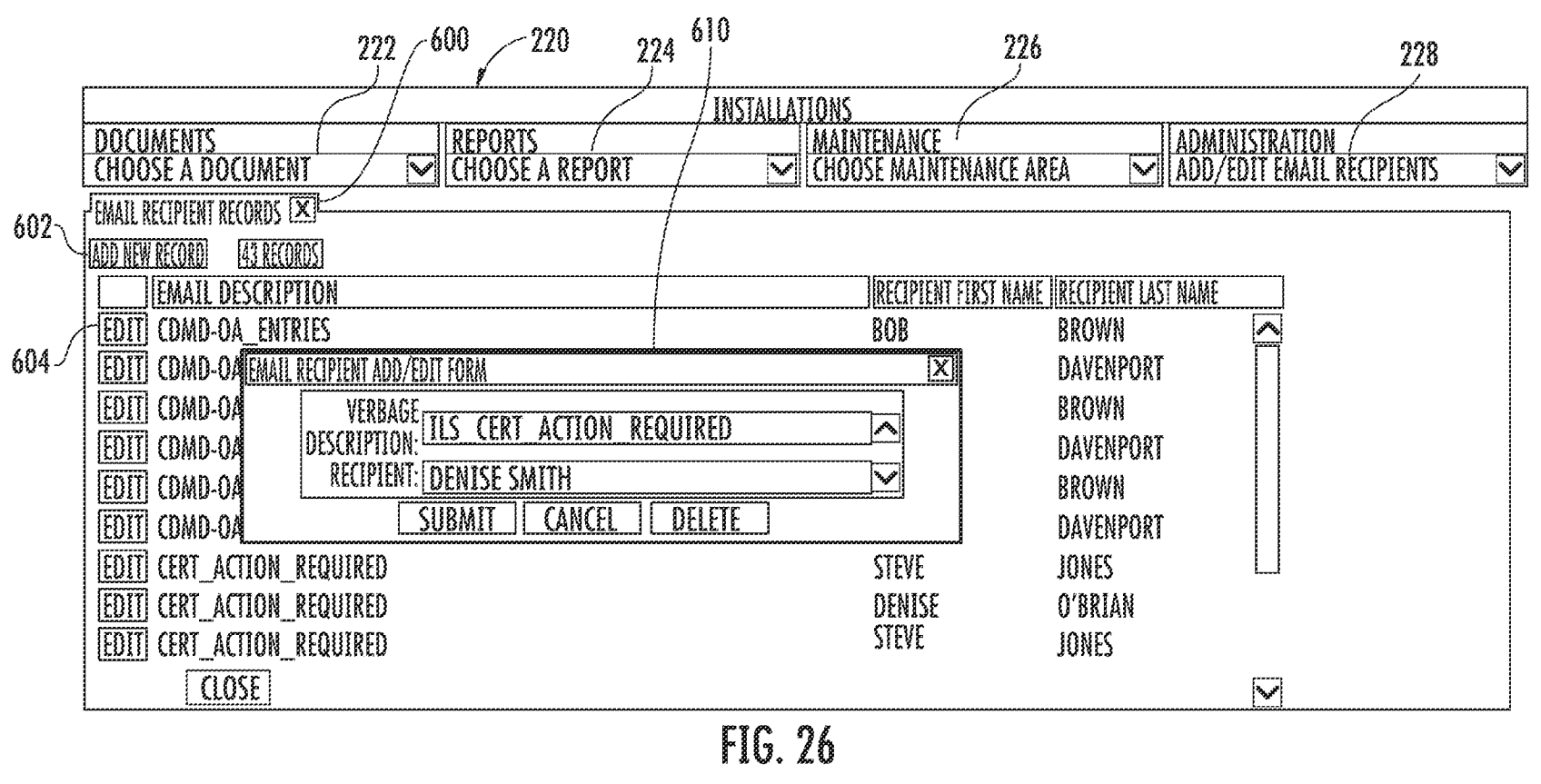
Figure 27:
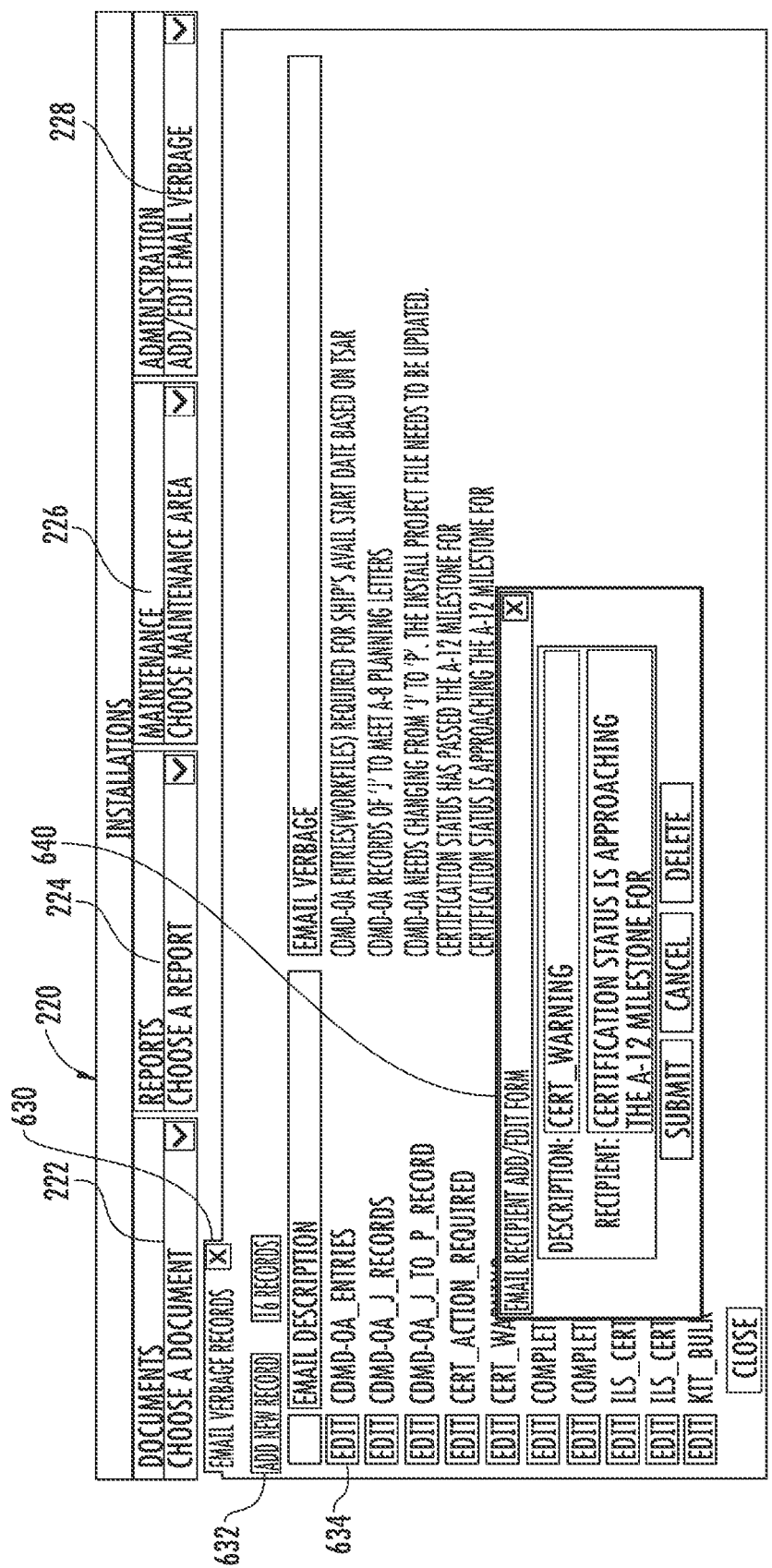

FIGS. 25-27 are screen shots of installations GUI 220 illustrating options of administration menu 228. A user activates the menu to choose from lists of dialogs to present, edit, add and delete project data. Like-named submodules perform the functions listed in the menu. An administration sub-module provides the capability to open the following GUIs to add or edit the data displayed in the various installation reports. FIGS. 26 and 27 are screen shots of exemplary administration dialogs for editing e-mail records. System 10 automatically generates e-mail notifications of actions past due, according to the alert rules, e-mail recipients, and e-mail descriptions. One exemplary dialog is e-mail recipient dialog 600 comprising add new record button 602 for adding new e-mail recipients and edit button 604 for editing e-mail recipients and the association between the recipient and an e-mail description, which association is achieved by selecting the recipient and e-mail description from drop-down lists provided by edit form 610. The other exemplary dialog is e-mail verbiage dialog 630 comprising add new record button 632 for adding new e-mail messages and edit button 634 for editing e-mail verbiage and the association between the e-mail description and its verbiage, which association is achieved by entering the description and verbiage in fields provided by form 640. Other Add/Edit forms may be selected to add or modify Alt Type, Alt Costs, Install Contractor, Facility Classes, Delivery Schedule Locations, etc.

Finally, the Upload Documents menu selection enables a user to upload documents. A dialog with an Upload New Document button (not shown) opens to input a document name and title, SCD number, and type of document, e.g. SCD, drawing or LOA. After the required data is provided and the upload button is activated, the document is uploaded which causes the generation of corresponding dashboard links and resetting of various alert status indicators.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A project management system comprising:
   a non-transitory computer readable storage medium operable for storing a plurality of machine readable computer instructions operable to control one or more elements of an information processing system including a processor, a display, an input section, and an output section to generate outputs comprising:
   a first section of machine readable computer instructions adapted to operate said information processing system to receive a first plurality of data from said input section, associate, and store a first data structure for storing a database of item approval group data sets that store one or more approval pipe segments collectively required to obtain all approval pipe segments associated with a respective item within said information processing system, each of said item approval group data sets comprises user identifier data, group identifier data, class data, approval pipe segment order data defining a sequence identifier for each approval pipe segment having a matching group data instance value, approval pipe segment identification data, approval pipe segment contact identification data associated with each said approval pipe segment identification data, message address associated with each said approval pipe segment identification data, and message data associated with each said approval pipe segment identification data, wherein said approval pipe segments indicate a department or organizational functional approval data identifier, wherein each said respective item within said information processing system comprises material items and logistics items;
   a second section of machine readable computer instructions adapted to operate said information processing system to receive a second plurality of data from said input section, associate, and store a second data structure for a plurality of item approvals within said information processing system comprising an item identifier data, an item approval date data, said approval pipe segment contact identification data, and record identification data;
   a third section of machine readable computer instructions adapted to operate said information processing system to receive a third plurality of data from said input section, associate, and store a third data structure for project requirement approvals within said information processing system comprising asset or facility class data, installation event data, requirement data, requirement rules data, requirement approval date, alert indicator data, requirement contact data, message address data, alert level data, and message data, said installation event data comprises availability date data, installation event start date data, installation event completion date data, installation event conjunctive alteration data, and installation event location data, wherein said installation event data comprises alteration event data, said alteration event data comprises ship or equipment alteration data;
   a fourth section of machine readable computer instructions adapted to operate said information processing system to receive and store a fifth data structure for data associated with at least one individual asset or facility identifier associated with one of said asset or facility class data within said information processing system;
   a fifth section of machine readable computer instructions configured to operate said information processing system to generate at least one of a plurality of user interfaces in said display and associate one or more of a plurality of graphically displayed project related data and data entry fields shown in at least one of said plurality of user interfaces comprising one or more data included in said first, second, third, and fourth data structures and to initiate said information processing system to engage in processing and tracking one or more project segment approval actions associated with at leastone installation event, a material or logistics event and another machine readable computer instruction for selecting one or more of said approval pipe segments related to a respective said at least one installation event, material or logistics event and associating the approval pipe segments with said item approval group data sets using at least one of the plurality of user interfaces;

a sixth section of machine readable computer instructions for generating at least one of said plurality of user interfaces for selecting one of said item identifier data from a plurality of displayed item identifier data, the item identifier data being associated with the group identifier data so that selection of the item identifier data automatically associates with the respective approval group identifier data for the selected respective item;

a seventh section of machine readable computer instructions for automatically operating said information processing system to sequentially engage in selecting one or more unapproved item identifiers associated with respective said item approval date data having no approval date input and saving each said selected one or more unapproved item identifiers in an unapproved item data structure;

an eighth section of machine readable computer instructions operable to operate said information processing system to send a first message through said output section to a first contact's system using a related said approval pipe segment contact identification data notifying the first contact's system that a first unapproved link is awaiting an approval, the first message being sent upon said selection of the first unapproved link, and to send a second message to the first contact's system using said approval pipe segment contact identification data after a predetermined time stored in said information processing system without receipt of the respective approval, said first and second message comprises a plurality of message data comprising a description of at least one said installation event, material or logistics event and an approval status related to one or more said installation event, material or logistics event;

a ninth section of machine readable computer instructions operable to operate said information processing system to selectively transition one or more said approval pipe segments indicating said one or more approval pipe segments has an unapproved status into an approved link status upon respective approval receipt and repeat said seventh, eighth, and ninth sections of machine readable computer instructions for each unapproved approval pipe segment having a matching said group identifier data upon receipt of said respective approval receipt, said ninth section of machine readable computer instructions further operable to release a hold or issue control of a respective said approval pipe segments previously having one of said respective unapproved status when every approval pipe segment having and an identical group identifier has been selectively transitioned from said unapproved status to said approved link status;

a tenth section of machine readable computer instructions adapted to operate said information processing system to selectively display on said display or output respective approval status output from said output section when every said approval segment in an approval chain within a respective group of said approval pipe segments having matching group identifiers has been approved, said approval status output comprising data associated with at least one of said approval pipe segments in said approval chain associated with at least one said installation event, material or logistics event, and at least one said item associated with at least one said installation event, material or logistics event;

an eleventh section of machine readable computer instructions adapted to track a project requirement related to one or more said installation event, material or logistics events so that performance of the project requirement is displayed with a ready to commence status indicator in at least one of said plurality of user interfaces upon completion of respective approval pipe segments associated with the respective project requirement;

a twelfth section of machine readable computer instructions configured to operate said information processing system to access at least one network data repository through an encrypted network interface containing source data associated with at least one said installation event, material or logistics event;

a thirteenth section of machine readable computer instructions adapted to operate said information processing system to selectively output at least one of said plurality of user interfaces on said display comprising another approval status output comprising a plurality of color coded status depictions indicating approval or a lack of approval status of at least one selected said approval pipe segments associated with at least one installation event, material or logistics event, wherein said at least one of said plurality of user interfaces is output based on one or more predetermined events including a date or time value or based on a user input using said input section;

wherein said plurality of machine readable computer instructions are configured to selectively display on said display in at least one of said plurality of user interfaces displaying total or partial approval of some or all of said items within said information processing system corresponding to respective item identifier data using different displayed colors visually signaling said total or partial approval;

wherein the departments include at least one of logistics, purchasing, inventory control, finance, and management;

wherein said department is selected by selecting approval pipe segments data using said input section and said display on at least one of said plurality of user;

wherein the first message is selected by one of said plurality of machine readable instructions based upon comparison of at least one date in said third data structure to a current date;

wherein said ninth section of machine readable computer instructions further comprises said instructions configured to send a third message to a second contact after a stored predetermined time without receipt of another selected respective or associated said approval for another unapproved link associated with a related or respective approval pipe segment data, wherein said third message indicates said selected unapproved approval pipe segment is awaiting approval;

wherein receipt of at least one said approval comprises one of uploading a document, inputting a completion date data, and changing a logical field status using said display, said input section, and at least one of said plurality of said user interfaces;

wherein each respective said item within said information processing system comprises a material event further comprising inventory management events.

2. The project management system of 1, wherein the departments include at least one of logistics, purchasing, inventory control, finance, and management.

3. The project management system of claim 1, wherein the departments are selected by selecting a chain identifier.

4. The project management system of claim 1, wherein receipt of the approval comprises one of uploading a document, inputting a completion date, and changing a logical field status.

5. A non-transitory computer readable medium operable in a processing device to manage inventories, the non-transitory computer readable medium comprising:

a first processing sequence for generating a user interface to select an approval chain and associate the approval chain with a chain identifier, the approval chain including a group of departments from a plurality of departments, each department being responsible for approving a link of the approval chain;

a second processing sequence for selecting an item from a plurality of items based upon an item identifier, the item identifier being associated with the chain identifier so that selection of the item identifier automatically selects the approval chain for the item;

a third processing sequence for selecting an unapproved link from the approval chain;

a fourth processing sequence operable to send a first message to a first contact notifying the first contact that the unapproved link is awaiting an approval and to send a second message to the first contact after a predetermined time without receipt of the approval; and a fifth processing sequence operable to convert the unapproved link into the approved link upon receipt of the approval and to release control of the item when every link in the approval chain has been approved.

6. A method to manage approvals, the method comprising the steps of:

providing a computing system including a user interface for enabling a user to input a plurality of project data to initiate processing and tracking one or more approval actions for a material or logistics event and a processing sequence for selecting an approval chain and associating the approval chain with a chain identifier, the approval chain including an approval order and a group of departments from a plurality of departments, each department being responsible for approving a link of the approval chain in the approval order;

selecting an item identifier corresponding to an item from a plurality of items;

associating the item identifier with the chain identifier using the user interface so that selection of the item identifier automatically selects the approval chain for the item;

selecting an unapproved link from the approval chain, the unapproved link being the first unapproved link in the approval order;

automatically sending a first message electronically to a first contact related to the unapproved link, wherein said first message is sent in a form selected from an email, a voicemail, a fax, and a text-message, said first message comprises a plurality of data comprising a description of at least one said material or logistics event and an approval status related to one or more said material or logistics event;

converting the unapproved link into the approved link upon receipt of an approval by changing a field in a data-structure provided to track each link in the approval chain; and selectively displaying or outputting an approval status output when every said link in the approval chain has been approved, said approval status output comprising data associated with at least one link in said approval chain, at least one said material or logistics event, and at least one said item associated with at least one said material or logistics event.

7. A method as in claim 6, wherein the group of departments includes at least one of logistics, purchasing, inventory control, finance, and management.

8. A method as in claim 6, wherein the group of departments is selected by selecting the chain identifier.

9. A method as in claim 6, further comprising the step of tracking a project requirement so that performance of a project may commence upon completion of the project requirement, wherein the project requirement is completed when the last unapproved link in the approval order is converted to the approved link.

10. A method as in claim 9, wherein the first message is selected based upon comparison of a due date of the project requirement to a current date.

11. A method as in claim 9, further comprising the step of receiving a plurality of item identifiers related to the project such that the approval chain is used to approve each of a plurality of items corresponding to the plurality of item identifiers.

12. A method as in claim 6, wherein a second message is sent to the first contact after a predetermined time without receipt of the approval.

13. A method as in claim 12, wherein a third message is sent to a second contact after a predetermined time without receipt of the approval.

14. A method as in claim 6, wherein receipt of the approval comprises one of uploading a document, inputting a completion date, and changing a logical field status.

15. A method to manage approvals, the method comprising the steps of:

providing a computing system including a user interface for enabling a user to input a plurality of project data to initiate processing and tracking one or more approval actions for a material or logistics event and another processing sequence for selecting an approval chain related to said material or logistics event and associating the approval chain with a chain identifier, the approval chain including a group of departments from a plurality of departments, each department being responsible for approving a link of the approval chain;

selecting an item identifier corresponding to an item from a plurality of items; associating the item identifier with the chain identifier using the user interface so that selection of the item identifier automatically selects the approval chain for the item;

selecting an unapproved link from the approval chain;

automatically sending a first message electronically to a first contact related to the unapproved link, wherein said first message may be sent in one or more forms such as in email, voicemail, fax, or a text-message form, said first message comprises a plurality of data comprising a description of at least one said material or logistics event and an approval status related to one or more said material or logistics event;

automatically sending a second message to the first contact after a predetermined time without receipt of the approval; and converting the unapproved link into the approved link upon receipt of an approval by changing a field in a data-structure provided to track each link in the approval chain; and selectively displaying or outputting an approval status output when every said link in the approval chain has been approved, said approval status output comprising data associated with at least one link in said approval chain, at least one said material or logistics event, and at least one said item associated with at least one said material or logistics event.

16. A method as in claim 15, wherein a third message is sent to a second contact after a predetermined time without receipt of the approval.

17. A computing system to track the movement of inventory items, the computing system comprising:

a processing device;

a computer readable medium for storing a plurality of department identifiers corresponding to a plurality of departments, a plurality of contacts, a plurality of item identifiers corresponding to a plurality of items; and a plurality of processing sequences configured to release control of an item selected from the plurality of items, the plurality of processing sequences including:

a first processing sequence for selecting an approval chain and associating the approval chain with a chain identifier, the approval chain including an approval order and a group of departments from the plurality of departments, each department being responsible for approving a link of the approval chain in the approval order;

a second processing sequence for selecting the item based upon an item identifier selected from the plurality of item identifiers, the item identifier being associated with the chain identifier so that selection of the item identifier automatically selects the approval chain for the item;

a third processing sequence for selecting an unapproved link from the approval chain, the unapproved link being the first unapproved link in the approval order;

a fourth processing sequence operable to send a first message to a first contact notifying the first contact that the unapproved link is awaiting an approval and to send a second message to the first contact after a predetermined time without receipt of the approval; and a fifth processing sequence operable to convert the unapproved link into the approved link upon receipt of the approval and to release control of the item when every link in the approval chain has been approved.

18. A computing system as in claim 17, wherein the group of departments includes at least one of logistics, purchasing, inventory control, finance, and management.

19. A computing system as in claim 17, wherein the group of departments is selected by selecting the chain identifier.

20. A computing system as in claim 17, further comprising a sixth processing sequence configured to track a project requirement so that performance of a project may commence upon completion of the project requirement, wherein the project requirement is completed when control of the item is released.

21. A computing system as in claim 20, wherein the first message is selected based upon comparison of a due date of the project requirement to a current date.

22. A computing system as in claim 20, further comprising a seventh processing sequence configured to receive a plurality of item identifiers related to the project such that the approval chain is used to approve each of a plurality of items corresponding to the plurality of item identifiers.

23. A computing system as in claim 17, wherein a third message is sent to a second contact after a predetermined time without receipt of the approval.

24. A computing system as in claim 17, wherein receipt of the approval comprises one of uploading a document, inputting a completion date, and changing a logical field status.

25. A computing system to track the movement of inventory items, the computing system comprising:

a processing device;

a computer readable medium for storing a plurality of department identifiers corresponding to a plurality of departments, a plurality of contacts, a plurality of item identifiers corresponding to a plurality of items; and a plurality of processing sequences configured to release control of an item selected from the plurality of items, the plurality of processing sequences including:

a first processing sequence for selecting an approval chain and associating the approval chain with a chain identifier, the approval chain including a group of departments from the plurality of departments, each department being responsible for approving a link of the approval chain;

a second processing sequence for selecting the item based upon an item identifier, the item identifier being associated with the chain identifier so that selection of the item identifier automatically selects the approval chain for the item;

a third processing sequence for selecting an unapproved link from the approval chain;

a fourth processing sequence operable to send a first message to a first contact notifying the first contact that the unapproved link is awaiting an approval and to send a second message to the first contact after a predetermined time without receipt of the approval; and a fifth processing sequence operable to convert the unapproved link into the approved link upon receipt of the approval and to release control of the item when every link in the approval chain has been approved.

26. A computing system to track the movement of inventory items, the computer readable medium comprising:

a processing device;

a computer readable medium for storing a plurality of department identifiers corresponding to a plurality of departments, a plurality of contacts, a plurality of item identifiers corresponding to a plurality of items; and a software program embedded in the computer readable medium operable by the processing device to:

select with a user interface an approval chain and associate the approval chain with a chain identifier, the approval chain including a group of departments from a plurality of departments, each department being responsible for approving a link of the approval chain;

select an item identifier corresponding to an item from a plurality of items; associate the item identifier with the chain identifier using the user interface so that selection of the item identifier automatically selects the approval chain for the item;

select an unapproved link from the approval chain;

automatically send a first message electronically to a first contact related to the unapproved link;

automatically send a second message to the first contact after a predetermined time without receipt of the approval; and convert the unapproved link into the approved link upon receipt of an approval by changing a field in a data-structure provided to track each link in the approval chain.

27. A method of managing an inventory, the method comprising: receiving a request to release control of an inventory item;

using a user interface to select an approval chain comprising a plurality of links, each link associated with a contact responsible for approving the corresponding link;

associating the inventory item with the approval chain;

selecting an unapproved link from the approval chain in an approval order, the unapproved link being the first unapproved link in the approval order;

sending a first message to a first contact notifying the first contact that the unapproved link is awaiting an approval and to send a second message to the first contact after a predetermined time without receipt of the approval; and converting the unapproved link into the approved link upon receipt of the approval;

and releasing control of the inventory item when every link in the approval chain has been approved.

28. A system to manage inventories and projects comprising a computer readable medium comprising a plurality of processing sequences stored in the medium and readable by a computer, the plurality of processing sequences including:

a first processing sequence for generating a user interface adapted to permit a user to input a plurality of project data to initiate processing and tracking one or more approval actions for a material or logistics event and another processing sequence for selecting an approval chain related to said material or logistics event and associating the approval chain with a chain identifier using the user interface, the approval chain including an approval order and a group of departments from a plurality of departments, each department being responsible for approving a link of the approval chain in the approval order;

a second processing sequence for selecting with the user interface an item from a plurality of items based upon an item identifier, the item identifier being associated with the chain identifier so that selection of the item identifier automatically selects the approval chain for the item;

a third processing sequence for automatically selecting an unapproved link from the approval chain, the unapproved link being the first unapproved link in the approval order;

a fourth processing sequence operable to send a first message to a first contact notifying the first contact that the unapproved link is awaiting an approval, the first message being sent upon selection of the unapproved link, and to send a second message to the first contact after a predetermined time without receipt of the approval, wherein said first and second message may be sent in one or more forms such as in email, voicemail, fax, or a text-message form, said first and second message comprises a plurality of data comprising a description of at least one said material or logistics event and an approval status related to one or more said material or logistics event;

a fifth processing sequence operable to convert the unapproved link into the approved link upon receipt of the approval and to release control of the item when every link in the approval chain has been approved; and a sixth processing sequence adapted to selectively display or output an approval status output when every said link in the approval chain has been approved, said approval status output comprising data associated with at least one link in said approval chain, at least one said material or logistics event, and at least one said item associated with at least one said material or logistics event.

29. A system as in claim 27, further comprising a seventh processing sequence configured to track a project requirement related to one or more said material or logistics event so that performance of a project may commence upon completion of the project requirement, wherein the project requirement is completed when control of the item is released.

30. A system as in claim 29, further comprising an eighth processing sequence configured to receive a plurality of item identifiers related to the project such that the approval chain is used to approve each of a plurality of items corresponding to the plurality of item identifiers.

31. A system as in claim 30, further comprising a ninth processing sequence adapted to selectively output a graphical user interface display representation comprising another approval status output comprising a plurality of color coded depictions of said approval chain associated with at least one material or logistics event, wherein said graphical user interface display representation is output based on one or more predetermined events including a date or time value or based on a user input.

32. A system as in claim 31, further comprising a tenth processing sequence, said project data further comprising installation data representing projects having tasks performed at a facility which has availability constraints, said tasks relate to process requirements for one or more said material or logistics event, said tenth processing sequence is adapted to generate alert outputs for users to illustrate an alert status of each requirement to illustrate an overall status of a plurality of projects associated with said project data, said tenth processing sequence further comprises a graphical user interface for enabling input relating to said installation data.

33. A system as in claim 32, wherein said alert status of the requirements of the plurality of projects are based on a time difference between a current date and a target date corresponding to each requirement.

34. A system as in claim 32, further comprising an eleventh processing sequence adapted to enable a user to select a first project from the plurality of project data and to select said alert status, based on the selections, overrides the alert status of an incomplete one of said requirements of said first project.

35. A system as in claim 34, wherein said override may be implemented by toggling an alert status field, said eleventh processing sequence may evaluate an indicator field first and, if set, may ignore a time-based calculation since the result is overridden by a status of the indicator field.

36. A system as in claim 32, further comprising a data structure comprising data fields for asset class, installation identification, availability date, installation start date, installation completion date, wherein said installation start and completion dates represents a time window when material or logistics events are permitted, conjunctive alteration, and location, wherein said conjunctive alteration information may also include an alteration identification of said conjunctive alteration and other information for coordinating said material or logistics events associated with the conjunctive alterations, said asset classes are provided to coordinate deployment of upgrades across asset classes, said location is provided to define where the asset will be located during the availability period defined by the installation start and completion dates.

37. A system as in claim 36, further comprising different said approval chains that are different for more than one said installation data or asset classes.

38. A system as in claim 29, further comprising a dashboard graphical user interface adapted to display one or more said requirements, wherein said dashboard output is determined by a configuration data which is input by a user to select project data associated with said items or installation data, wherein said dashboard further comprises a conceptual project management display that shows selected timing-based alert rules and color-coded alert indicia associated with said project data, one or more process data, said item data, and said installation data.

39. A system as in claim 38, wherein said color-coded alert indicia comprise a red color code for a said requirement which requires immediate attention, a green color code for a said requirement which has been satisfied.

40. A system as in claim 29, further comprising at least one priority data associated with at least one said requirement.

41. A system as in claim 40, further comprising a graphical user interface which displays one or more of the following plurality of data comprising alteration identifier, alteration number, type of alteration, last day of facility availability, first day of facility availability, a location of the facility during the availability time, a standard installation configuration, a configuration status, a conjunctive alteration, a name of said facility, an integrated logistics support date, a letter of authorization, a material status, a region where the facility is located during the availability time, an installation drawings status, and a regional office status.

42. A system as in claim 28, wherein a third message is sent to a second contact after a predetermined time without receipt of the approval, wherein said third message indicates said unapproved link is awaiting approval.

43. A system as in claim 28, wherein receipt of the approval comprises one of uploading a document, inputting a completion date, and changing a logical field status.

44. A system as in claim 28, wherein said system further comprises a database adapted to store a plurality of inventory data related to one or more said items, wherein said release of control of the item when every link in the approval chain has been approved results in a release of control data output sent to a custodian of one or more said items prompting said custodian to engage in sequential processes for shipping at least one said item, wherein said release of control further triggers an updating of one or more said inventory data.

45. A system as in claim 28, further comprising a processing device adapted to process said processing sequences.

46. A system as in claim 28, wherein said item is stored and has a plurality of item data, said data further has one or more item categories, said one or more item categories can include a material item or a logistics item, said item data associated with said material item may comprise item attributes such as owner, serial number, version, production date, weight, cost, and kit number, said item data associated with a logistics item may comprise shipping and receiving destination and date information, tracking number, and item number of the item shipped.

47. A system as in claim 28, wherein said second message further comprises a high priority indicator indicating a critical nature of said unapproved link related to a customer requirement or a deadline.

48. A system as in claim 28, wherein the group of departments includes at least one of logistics, purchasing, inventory control, finance, and management.

49. A system as in claim 28, wherein the group of departments is selected by selecting the chain identifier.

50. A system as in claim 29, wherein the first message is selected based upon comparison of a due date of the project requirement to a current date.

51. A project management system comprising:
a non-transitory computer readable medium;
a first information processing system; and
a plurality of non-transitory processing sequences comprising machine readable instructions stored on said non-transitory computer readable medium adapted for operating said first information processing system comprising a processor configured to operate said project management system based on said machine readable instructions, a display, an interface section comprising a plurality of user interfaces, an input/output section, said machine readable instructions comprising:
a first group of processing sequences associated with an installations module operable to receive and store in said project management system a plurality of requirement and project data input respectively associated with a plurality of projects and then selectively output said requirement and project data in documents, reports and at least one of said plurality of user interfaces from at least said input/output section, wherein said installation module further creates, stores, and modifies a first plurality of project approval segments that is further associated with a respective approval chain identifier data denoting said first plurality of project approval segments are collectively required data associated with at least some of said plurality of said requirement and project data;
a second group of processing sequences associated with an inventory module operable to facilitate creating, storing, and modifying a plurality of inventory or material management activities data structures associated with a plurality of material or supply items data respectively associated with a plurality of material or supply items, said second group of processing sequences configured to execute inventory or material management activities using said processor comprising monitoring and associating said material or said supply items data with said plurality of requirements and project data, wherein said inventory module creates, stores, and modifies a second plurality of project approval segments associated with said plurality of material or supply items data; and a third group of processing sequences associated with a logistics module operable to controls said processor for operating said information processing system for creating, storing, and modifying planning data associated with movements of said materials or said supply items used in relation to said plurality of requirement and project data, wherein said logistics module creates, stores, and modifies a third plurality of project approval segments associated with at least some of said plurality of requirement and project data in response to said planning data associated with movements of said materials or said supply items input in said information processing system; and a fourth group of processing sequences associated with a predictive action module comprising a section operable to operate said first information processing system to enable a user to upload data and an image associated with one or more transaction trigger source documents using at least said input/output section, said one or more transaction trigger source documents comprising a supply, material or movement transaction trigger source document that depicts said planning data associated with said movements of said materials or supply items or one or more of said plurality of material or supply item data stored in a second information processing system, wherein said predictive action module stores a date associated with said transaction trigger source document where said date is a predicted date associated with actions associated with a movements, material, or supply items data, said predictive action module further includes processing sequences operable for triggering a predictive action failure warning relative to one or more data associated with said movement, materials, or said supply items data in relation to at least one related said plurality of requirements and project data when said predicted date is passed and said movement, material, or supply action data are not changed to record completion data in said second information processing system storing said data associated with one or more said movement, material, or supply actions;

a fifth group of processing sequences configured to generate on at least said display at least one of said plurality of user interfaces operable to display user selectable controls and information on said at least one of said plurality of user interfaces related to said installation module, inventory module, and logistics module;

wherein said at least one of said plurality of user interfaces is operable to display a plurality of alert indicia corresponding to a plurality of alert status data, wherein said plurality of alert status data further comprises a plurality of user selectable color coded graphical user interface tabs, at least some of said user interface tabs, when selected by a user, display a plurality of selected said projects associated with facility or asset identifier data having matching said alert status data or alert indicia associated with said user selectable color coded graphical user interface tabs;

wherein said at least one of said plurality of user interfaces are operable to display a plurality of said alert indicia corresponding to a plurality of alert status that further comprises a plurality of user selectable interface regional tabs operable for selecting one or more said plurality of projects associated with one of said facility or asset identifier data;

wherein the alert indicia further comprises a coded color scheme having a plurality of colors representing a plurality of priority levels;

wherein the alert indicia indicate a condition from a group comprising no action required, action required, and immediate action required.

52. A project management system as in claim 51, further including another group of non-transitory processing sequences operable for operating said first information processing system to generate one of said plurality of user interfaces operable to enable a user to select a plurality of projects and override the alert status of one or more said incomplete requirements of the plurality of projects based on one or more said project alert status selected.

* * * * *